United States Patent
Akiyoshi

(10) Patent No.: US 9,882,819 B2
(45) Date of Patent: Jan. 30, 2018

(54) METHOD AND APPARATUS FOR CONTROLLING SERVICE QUALITY IN COMMUNICATION SYSTEM, AND COMMUNICATION APPARATUS

(71) Applicant: NEC Corporation, Tokyo (JP)

(72) Inventor: Ippei Akiyoshi, Tokyo (JP)

(73) Assignee: NEC Corporation, Tokyo (JP)

(*) Notice: Subject to any disclaimer, the term of this patent is extended or adjusted under 35 U.S.C. 154(b) by 97 days.

(21) Appl. No.: 14/897,603

(22) PCT Filed: Jun. 13, 2014

(86) PCT No.: PCT/JP2014/003161
§ 371 (c)(1),
(2) Date: Dec. 10, 2015

(87) PCT Pub. No.: WO2014/199646
PCT Pub. Date: Dec. 18, 2014

(65) Prior Publication Data
US 2016/0142326 A1    May 19, 2016

(30) Foreign Application Priority Data

Jun. 13, 2013 (JP) ................................. 2013-124541

(51) Int. Cl.
*H04L 12/833* (2013.01)
*H04L 12/713* (2013.01)
(Continued)

(52) U.S. Cl.
CPC ........ *H04L 47/2458* (2013.01); *H04L 45/302* (2013.01); *H04L 45/586* (2013.01); *H04W 28/24* (2013.01)

(58) Field of Classification Search
CPC ... H04L 12/713; H04L 12/833; H04L 45/302; H04L 45/586; H04L 47/2458;
(Continued)

(56) References Cited

U.S. PATENT DOCUMENTS 6,937,566 B1 * 8/2005 Forslow ................ H04L 1/0017
370/231
9,659,251 B2 * 5/2017 Tang ...................... G06N 5/025
(Continued)

FOREIGN PATENT DOCUMENTS

EP    1 806 862 A1    7/2007
JP    2006-013891 A    1/2006
(Continued)

OTHER PUBLICATIONS

3GPP TR 23.401 V12.0.0 "General Packet Radio Service (GPRS) enhancements for Evolved Universal Terrestrial Radio Access Network (E-UTRAN) access", [retrieved on May 20, 2013] Internet <http://www.3gpp.org/ftp/Specs/html-info/23401.htm>.
(Continued)

*Primary Examiner* — Tri H Phan
(74) *Attorney, Agent, or Firm* — McGinn IP Law Group, PLLC

(57) ABSTRACT

A communication system, a method for controlling service quality, a control apparatus, and a communication apparatus are provided that enable flexible packet forward processing control based on service quality information. A communication system in which a logical path is established over a network to perform communication includes: a control apparatus that retains a policy indicating an association between a logical path and service quality information (QoS); and a communication apparatus that provides a packet with the service quality information (QoS) corresponding to the
(Continued)

FIRST EXEMPLARY EMBODIMENT logical path to which the packet belongs, in accordance with a control message sent from the control apparatus.

19 Claims, 32 Drawing Sheets

(51) Int. Cl.
*H04L 12/725* (2013.01)
*H04W 28/24* (2009.01)
(58) Field of Classification Search
CPC ..... H04W 28/24; H04W 28/10; H04W 76/02; H04W 92/14
See application file for complete search history.

(56) References Cited

U.S. PATENT DOCUMENTS

| | | | |
|---|---|---|---|
| 2003/0185249 A1* | 10/2003 | Davies | H04L 12/40143 370/535 |
| 2004/0109414 A1 | 6/2004 | Choi et al. | |
| 2008/0049631 A1* | 2/2008 | Morrill | H04L 41/5009 370/250 |
| 2008/0056273 A1 | 3/2008 | Pelletier et al. | |
| 2008/0123690 A1* | 5/2008 | Wang | H04L 12/2872 370/468 |
| 2008/0225743 A1 | 9/2008 | Damnjanovic | |
| 2009/0046641 A1* | 2/2009 | Wang | H04W 74/002 370/329 |
| 2010/0046531 A1* | 2/2010 | Louati | H04L 41/0806 370/401 |
| 2012/0100849 A1* | 4/2012 | Marsico | H04W 28/24 455/432.1 |
| 2012/0263186 A1* | 10/2012 | Ueno | H04L 45/38 370/401 |
| 2012/0320743 A1* | 12/2012 | De Roucy | H04L 41/0893 370/230 |
| 2013/0086582 A1* | 4/2013 | Cardona | H04L 69/12 718/1 |
| 2015/0117347 A1* | 4/2015 | Iwai | H04W 76/041 370/329 |
| 2016/0007279 A1* | 1/2016 | Byun | H04W 52/0206 455/422.1 |
| 2016/0157274 A1* | 6/2016 | Akiyoshi | H04W 76/02 370/254 |
| 2016/0174198 A1* | 6/2016 | Akiyoshi | H04W 24/02 370/329 |

FOREIGN PATENT DOCUMENTS

| | | |
|---|---|---|
| JP | 2006-166453 A | 6/2006 |
| JP | 2012-142937 A | 7/2012 |

OTHER PUBLICATIONS

Extended European Search Report dated Jan. 18, 2017.

* cited by examiner

SECOND EXEMPLARY EMBODIMENT

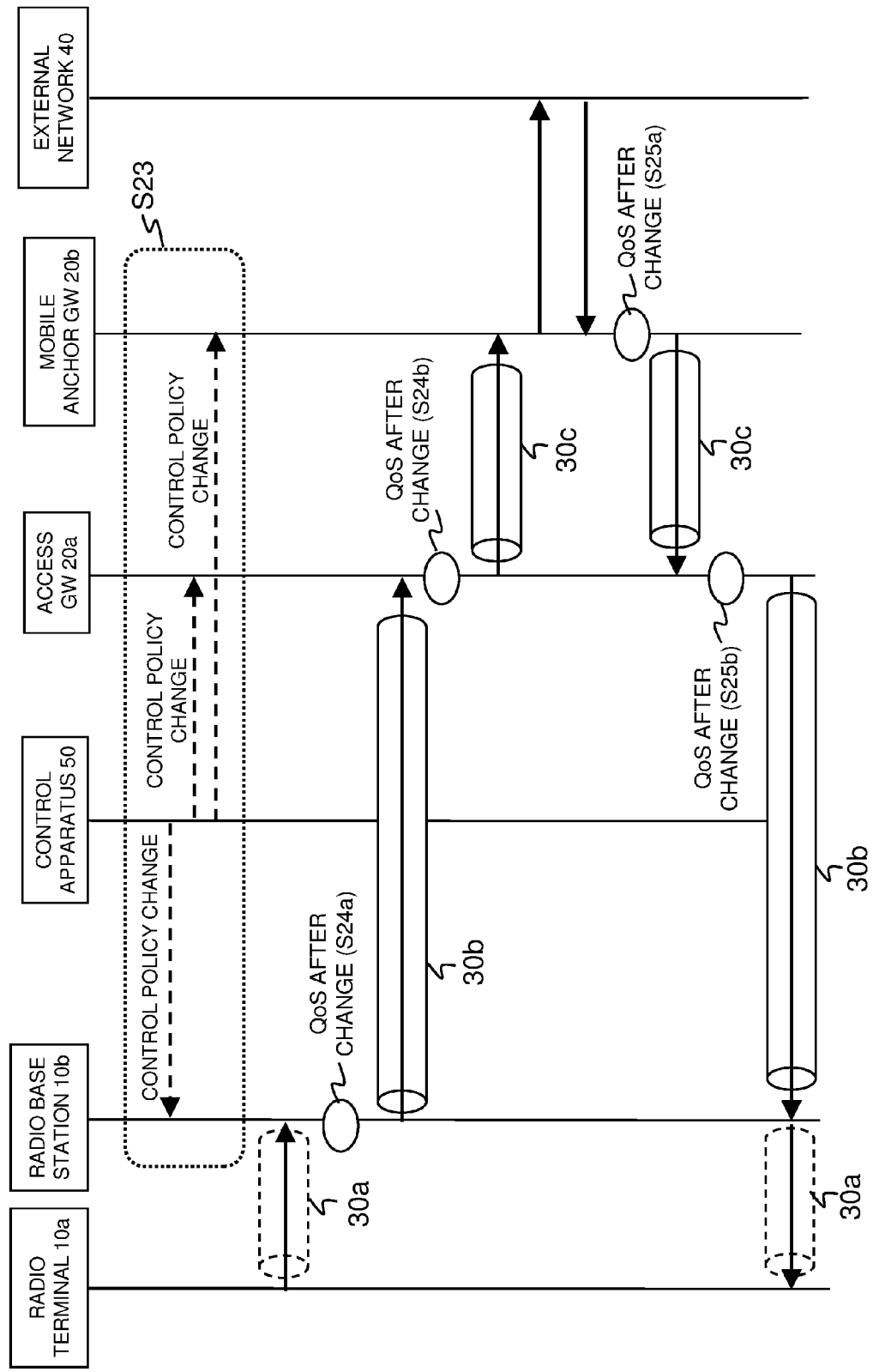

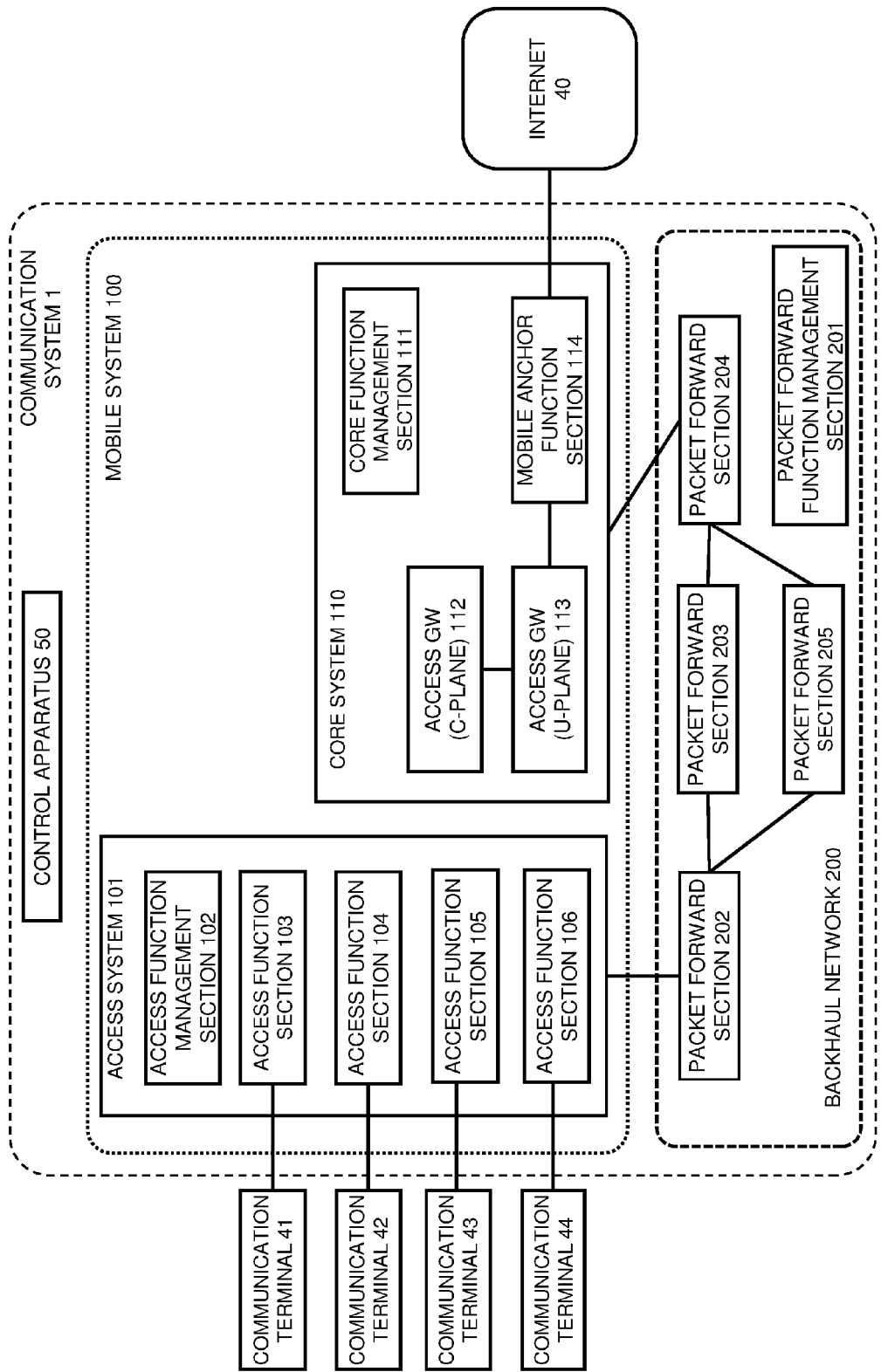
FIG. 12 THIRD EXEMPLARY EMBODIMENT

FIG. 13

PACKET FORWARD RULE TABLE

| SOURCE ADDRESS | DESTINATION ADDRESS | DSCP | OPERATION RULE |
|---|---|---|---|
| ADDRESS: A (ACCESS GW FUNCTION (U-PLANE) 113) | ADDRESS: a (ACCESS FUNCTION 103) | EF (101110) | FORWARD FROM PORT (1) |
| ADDRESS: A (ACCESS GW FUNCTION (U-PLANE) 113) | ADDRESS: b (ACCESS FUNCTION 104) | BE (000000) | FORWARD FROM PORT (2) |
| ADDRESS: A (ACCESS GW FUNCTION (U-PLANE) 113) | ADDRESS: c (ACCESS FUNCTION 105) | EF (101110) | FORWARD FROM PORT (3) |
| ADDRESS: A (ACCESS GW FUNCTION (U-PLANE) 113) | ADDRESS: d (ACCESS FUNCTION 106) | BE (000000) | FORWARD FROM PORT (4) |
| .. | .. | .. | .. |

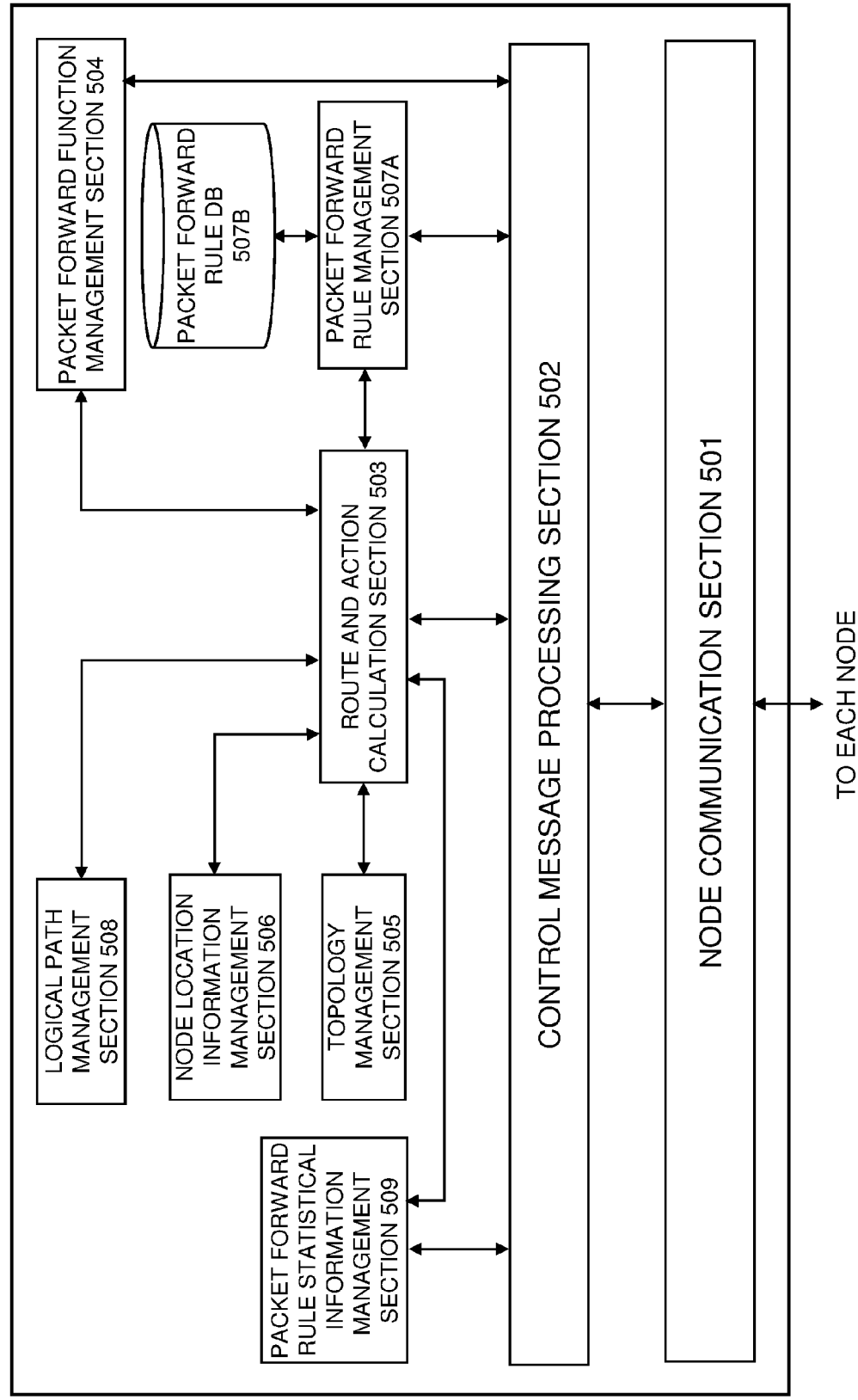

FIG. 16

MANAGEMENT INFORMATION BEFORE CHANGE

| TRAFFIC PRIORITY | QoS INFORMATION (QCI) OF HIGHER-LEVEL LOGICAL PATH | QoS INFORMATION (DSCP) OF LOWER-LEVEL LOGICAL PATH |
|---|---|---|
| HIGH | 1-4 | EF (101110) |
| LOW | 5-9 | BE (000000) |

FIG. 17

MANAGEMENT INFORMATION BEFORE CHANGE

| SOURCE TERMINAL | DESTINATION TERMINAL | QCI | MAXIMUM THROUGHPUT [bps] | THROUGHPUT [bps] |
|---|---|---|---|---|
| ACCESS GW FUNCTION (U-PLANE) 113 | ACCESS FUNCTION 103 | 1 | 80M | 80M |
| ACCESS GW FUNCTION (U-PLANE) 113 | ACCESS FUNCTION 104 | 5 | 40M | 20M |
| ACCESS GW FUNCTION (U-PLANE) 113 | ACCESS FUNCTION 105 | 4 | 40M | 40M |
| ACCESS GW FUNCTION (U-PLANE) 113 | ACCESS FUNCTION 106 | 9 | 80M | 60M |
| .. | .. | .. | .. | .. |

FIG. 18

MANAGEMENT INFORMATION BEFORE CHANGE

| SOURCE TERMINAL | DESTINATION TERMINAL | DSCP | THROUGHPUT [bps] |
|---|---|---|---|
| ACCESS GW FUNCTION (U-PLANE) 113 | ACCESS FUNCTION 103 | EF (101110) | 80M |
| ACCESS GW FUNCTION (U-PLANE) 113 | ACCESS FUNCTION 104 | BE (000000) | 20M |
| ACCESS GW FUNCTION (U-PLANE) 113 | ACCESS FUNCTION 105 | EF (101110) | 40M |
| ACCESS GW FUNCTION (U-PLANE) 113 | ACCESS FUNCTION 106 | BE (000000) | 60M |
| .. | .. | .. | .. |

BEFORE QoS-RELATED CONTROL POLICY CHANGE

FIG. 21

MANAGEMENT INFORMATION AFTER CHANGE

| TRAFFIC PRIORITY | QoS INFORMATION (QCI) OF HIGHER-LEVEL LOGICAL PATH | QoS INFORMATION (DSCP) OF LOWER-LEVEL LOGICAL PATH |
|---|---|---|
| HIGH | 1-3, 5 | EF (101110) |
| LOW | 4, 6-9 | BE (000000) |

FIG. 22

MANAGEMENT INFORMATION AFTER CHANGE

| SOURCE NODE | DESTINATION NODE | QCI | MAXIMUM THROUGHPUT [bps] | THROUGHPUT [bps] |
|---|---|---|---|---|
| ACCESS GW FUNCTION (U-PLANE) 113 | ACCESS FUNCTION 103 | 1 | 80M | 80M |
| ACCESS GW FUNCTION (U-PLANE) 113 | ACCESS FUNCTION 104 | 5 | 40M | 40M |
| ACCESS GW FUNCTION (U-PLANE) 113 | ACCESS FUNCTION 105 | 4 | 40M | 20M |
| ACCESS GW FUNCTION (U-PLANE) 113 | ACCESS FUNCTION 106 | 9 | 80M | 60M |
| .. | .. | .. | .. | .. |

FIG. 23

MANAGEMENT INFORMATION AFTER CHANGE

| SOURCE NODE | DESTINATION NODE | DSCP | THROUGHPUT [bps] |
|---|---|---|---|
| ACCESS GW FUNCTION (U-PLANE) 113 | ACCESS FUNCTION 103 | EF (101110) | 80M |
| ACCESS GW FUNCTION (U-PLANE) 113 | ACCESS FUNCTION 104 | EF (101110) | 40M |
| ACCESS GW FUNCTION (U-PLANE) 113 | ACCESS FUNCTION 105 | BE (000000) | 20M |
| ACCESS GW FUNCTION (U-PLANE) 113 | ACCESS FUNCTION 106 | BE (000000) | 60M |
| .. | .. | .. | .. |

FOURTH EXEMPLARY EMBODIMENT

SECOND EXAMPLE (GPRS)

THIRD EXAMPLE (3GPP2 cdma 1X/EVDO)

FOURTH EXAMPLE (WiMAX)

FIG. 32

| THIRD EXEMPLARY EMBODIMENT | EPS (FIRST EXAMPLE) | GPRS (SECOND EXAMPLE) | 3GPP2 cdma 1X/EVDO (THIRD EXAMPLE) | WiMAX (FOURTH EXAMPLE) |
|---|---|---|---|---|
| ACCESS FUNCTION 103, 104 | eNB | NodeB/RNC | BTS/BSC/RNC | BS |
| ACCESS GW FUNCTION (C-PLANE) 112 | MME | SGSN | PDSN | ASN-GW |
| ACCESS GW FUNCTION (U-PLANE) 113 | SERVING GW | | | |
| MOBILE ANCHOR FUNCTION 114 | PDN GW | GGSN | HA | HA |

METHOD AND APPARATUS FOR CONTROLLING SERVICE QUALITY IN COMMUNICATION SYSTEM, AND COMMUNICATION APPARATUS

TECHNICAL FIELD

The present invention relates to a communication system in which communication apparatuses perform communications through logical paths and, more particularly, to a method and an apparatus for controlling service quality, as well as a communication apparatus that establishes a logical path, and a control method for the communication apparatus.

BACKGROUND ART

In current radio communication systems, a radio terminal connects to a radio base station and accesses the Internet via a core network. The radio terminal performs packet communication through a communication path (i.e., a bearer) established between an apparatus (e.g., a gateway apparatus) provided in the core network and the radio base station.

The radio base station and the gateway apparatus build a tunnel by encapsulating packets in order to provide the bearer. In this event, QoS (Quality of Service) information is stored in the outer header of a packet, whereby each communication apparatus in the communication system can perform packet forward control (priority control or the like) based on the QoS information. Hereinafter, a specific description will be given by illustrating EPS (Evolved Packet System) using E-UTRAN (Evolved Universal Terrestrial Radio Access Network) as disclosed in NPL 1.

Referring to FIG. 1, a UE (User Equipment: radio terminal) can perform communication through a logical path or logical channel (higher-level logical path) referred to as EPS bearer, which is created between the UE and a PDN GW (Packet Data Network Gateway). This EPS bearer is configured in such a manner that logical paths or logical channels (lower-level logical paths) terminated between the UE and an eNodeB (radio base station), between the eNodeB and a Serving GW, and between the Serving GW and the PDN GW, respectively, are concatenated by mapping. Here, the lower-level logical path between the UE and the eNodeB is referred to as radio channel, and the lower-level logical paths between the eNodeB and the Serving GW and between the Serving GW and the PDN GW are referred to as GTP (GRPS Tunneling Protocol) tunnel, as shown in FIG. 1.

Moreover, QoS information is associated with the EPS bearer. When forwarding packets through a GTP tunnel, each of the eNodeB, Serving GW, and PDN GW embeds QoS information in the outer header of a packet for the GTP tunnel, based on the QoS information associated with the EPS bearer. The eNodeB, Serving GW, and PDN GW perform packet forward processing (such as priority control) based on the QoS information.

CITATION LIST

Non-Patent Literature

[NPL 1]
3GPP TR 23.401 V12.0.0 "General Packet Radio Service (GPRS) enhancements for Evolved Universal Terrestrial Radio Access Network (E-UTRAN) access", [retrieved on May 20, 2013] Internet <http://www.3gpp.org/ftp/Specs/html-info/23401.htm>

SUMMARY OF INVENTION

Technical Problem

However, QoS information to be embedded in the outer header based on the QoS information associated with the EPS bearer is one that was set at the time of system construction and cannot be changed. Accordingly, there has been a problem that flexible control based on QoS information cannot be performed in communication systems. For example, access apparatuses, such as the eNodeB, and gateway apparatuses, such as the Serving GW and PDN GW, cannot dynamically change/update QoS information to be embedded in the outer header for a GTP tunnel and therefore cannot perform flexible packet forward processing control depending on circumstances.

Accordingly, an object of the present invention is to provide a communication system, a method and an apparatus for controlling service quality, and a communication apparatus that enable flexible packet forward processing control based on service quality information.

Solution to Problem

A communication system according to the present invention is a communication system which establishes a logical path over a network to perform communication, characterized by comprising: a control apparatus that retains a policy indicating an association between the logical path and service quality information; and a communication apparatus that provide a packet with the service quality information corresponding to the logical path to which the packet belongs in accordance with a control message sent from the control apparatus.

A control apparatus according to the present invention is a control apparatus in a communication system in which a logical path is established over a network to perform communication, characterized by comprising: storage means that retains a policy indicating an association between the logical path and service quality information; and control means that sends a control message to a communication apparatus that establishes the logical path, wherein the control message instructs the communication apparatus to provide a packet with the service quality information corresponding to the logical path to which the packet belongs in accordance with the policy.

A method for controlling service quality according to the present invention is a method for controlling service quality in a communication system in which a logical path is established over a network to perform communication, characterized by comprising: retaining a policy indicating an association between the logical path and service quality information; and sending a control message to a communication apparatus that establishes the logical path, wherein the control message instructs the communication apparatus to provide a packet with the service quality information corresponding to the logical path to which the packet belongs in accordance with the policy.

A communication apparatus according to the present invention is a communication apparatus in a communication system in which a logical path is established over a network to perform communication, characterized by comprising: first means that receives a control message from a control apparatus that retains a policy indicating an association between the logical path and service quality information; and second means that provides a packet with the service quality information corresponding to the logical path to which the packet belongs in accordance with the control message.

A control method for a communication apparatus according to the present invention is a control method for a communication apparatus in a communication system in which a logical path is established over a network to perform communication, characterized by comprising: receiving a control message from a control apparatus that retains a policy indicating an association between the logical path and service quality information; and providing a packet with the service quality information corresponding to the logical path to which the packet belongs in accordance with the control message.

A control apparatus according to the present invention is a control apparatus in a communication system in which a logical path is established over a network to perform communication, characterized by comprising: storage means that retains a policy indicating an association between the logical path and service quality information; and control means that sends a control message to a node that processes a packet forwarded from a communication apparatus that establishes the logical path, wherein the control message instructs the communication apparatus to provide a packet with the service quality information corresponding to the logical path to which the packet belongs in accordance with the policy.

A communication node according to the present invention is a communication node in a communication system in which a logical path is established over a network to perform communication, characterized by comprising: first means that receives a control message from a control apparatus that retains a policy indicating an association between the logical path and service quality information; and second means that provides a packet forwarded from a communication apparatus that establishes the logical path with the service quality information corresponding to the logical path to which the packet belongs in accordance with the control message.

Advantageous Effects of Invention

According to the present invention, a control apparatus manages, in a changeable manner, control policies for a communication apparatus to provide service quality information corresponding to an attribute of a logical path to the additional header information of a packet to be forwarded, whereby it is possible to perform flexible control based on service quality information.

BRIEF DESCRIPTION OF DRAWINGS

FIG. 11 is a sequence diagram showing an example of service quality control operations in the communication system according to the second exemplary embodiment of the present invention.

FIG. 12 is a schematic architecture diagram of a communication system according to a third exemplary embodiment of the present invention.

FIG. 13 is a diagram schematically showing a table included in a packet forward section according to the third exemplary embodiment of the present invention.

FIG. 14 is a block diagram showing the schematic configuration of a control apparatus according to the third exemplary embodiment of the present invention.

FIG. 16 is a diagram schematically showing information before a change is made in first management information, which is managed by the control apparatus according to the third exemplary embodiment of the present invention.

FIG. 17 is a diagram schematically showing information before a change is made in second management information, which is managed by the control apparatus according to the third exemplary embodiment of the present invention.

FIG. 18 is a diagram schematically showing information before a change is made in third management information, which is managed by the control apparatus according to the third exemplary embodiment of the present invention.

FIG. 21 is a diagram schematically showing information after a change is made in the first management information, which is managed by the control apparatus according to the third exemplary embodiment of the present invention.

FIG. 22 is a diagram schematically showing information after a change is made in the second management information, which is managed by the control apparatus according to the third exemplary embodiment of the present invention.

FIG. 23 is a diagram schematically showing information after a change is made in the third management information, which is managed by the control apparatus according to the third exemplary embodiment of the present invention.

FIG. 32 is a diagram showing correspondences between communication nodes in the communication system according to the third exemplary embodiment shown in FIG. 12 and communication nodes in the communication systems according to the first to fourth examples.

DESCRIPTION OF EMBODIMENTS

According to exemplary embodiments of the present invention, a control apparatus changes a control policy for a communication apparatus to provide service quality information corresponding to a logical path to the additional header information of a packet (the outer header of a packet) to be forwarded, whereby it is possible to realize flexible packet forward processing control based on service quality information. Hereinafter, exemplary embodiments and examples of the present invention will be described in detail with reference to drawings.

1. First Exemplary Embodiment

1.1) System Architecture

Figure 1:
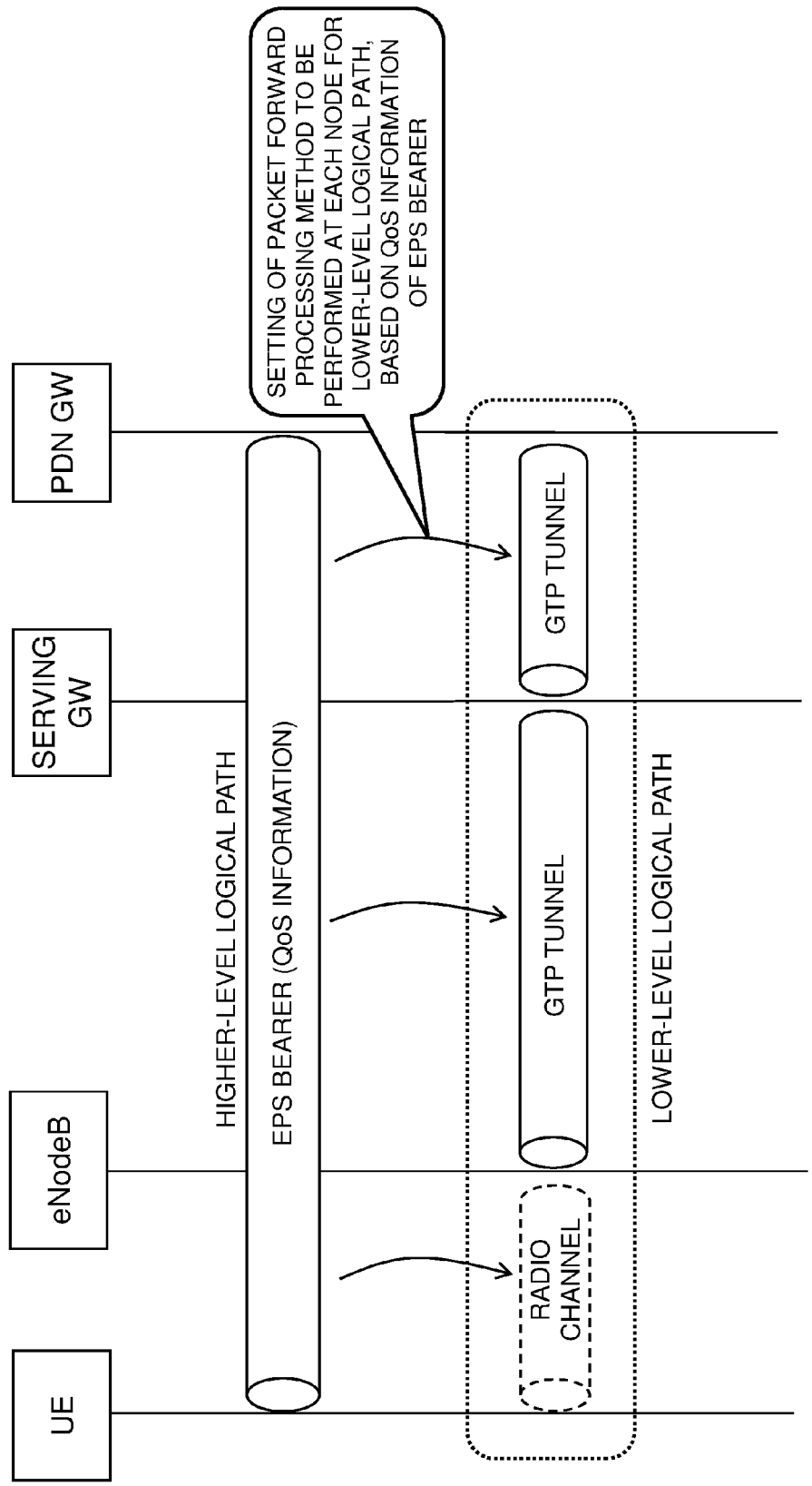
FIG. 1 is a schematic diagram of a system for describing the configurations of a logical path based on NPL 1.
Figure 2:
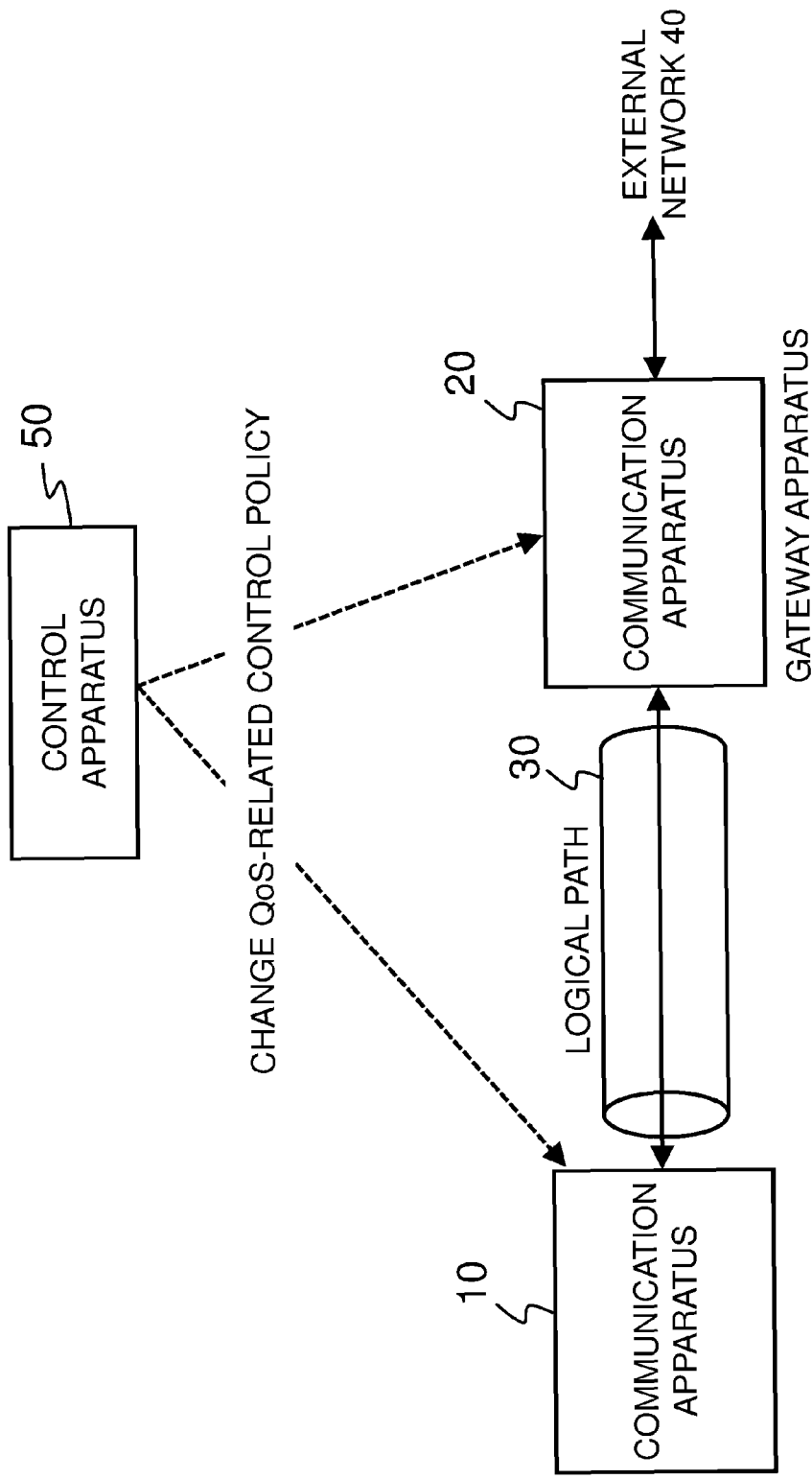
FIG. 2 is a schematic architecture diagram of a communication system according to a first exemplary embodiment of the present invention.

Referring to FIG. 2, a communication system according to a first exemplary embodiment of the present invention includes communication apparatuses 10 and 20, a logical path 30 created between these communication apparatuses, and a control apparatus 50 for controlling each communication apparatus. It is assumed that radio communication equipment such as a mobile terminal can communicate with an external network 40 via the communication apparatuses 10 and 20 in which the communication apparatus 20 functions as a gateway apparatus.

The communication apparatuses 10 and 20 each have a function of creating the logical path 30 (bearer) in accordance with their respective control policies, and the QoS information-related control policies of each communication apparatus are managed in a changeable manner by the control apparatus 50. Moreover, the communication apparatuses 10 and 20 each also have a function of terminating the logical path 30. The logical path 30 is defined by attributes such as the addresses of nodes on a packet forwarding path, a QoS parameter (capacity, error characteristic, delay, or the like), and information for identifying an IP flow to be forwarded.

The control apparatus 50 manages an association between the logical path 30 identified by the above-mentioned attributes and QoS information. A control policy is information indicating such an association between the logical path 30 and QoS information. Specifically, a control policy indicates, for example, an association between the attribute (e.g., QoS parameter "QCI (QoS Class Identifier)") of the logical path 30 and QoS information (e.g., "DSCP (Differentiated Services Code Point)") corresponding to that attribute.

The communication apparatuses 10 and 20 refer to information included in a packet (e.g., Layer 3/Layer 4 information in the OSI reference model, such as an IP address and a port number) to identify the logical path 30 to which the packet belongs and thereby can identify the attribute of the identified logical path 30. For example, the communication apparatuses 10 and 20 identify, from information included in a packet, that this packet belongs to the logical path 30 for video streaming, and thereby can identify the attribute (e.g., a QCI value for video streaming) of this logical path 30. The communication apparatuses 10 and 20 refer to the respective control policies to identify QoS information (e.g., "DSCP") associated with the identified logical path 30. Thus, the QoS information associated with the logical path 30 to which the packet belongs is given to this packet. Specifically, the communication apparatuses give QoS information according to the respective control policies to additional header information of the packet. Here, QoS information indicating the attribute of the logical path 30 is, for example, a QCI value. Moreover, QoS information associated with the attribute (QCI value) is, for example, a DSCP value.

Figure 3:
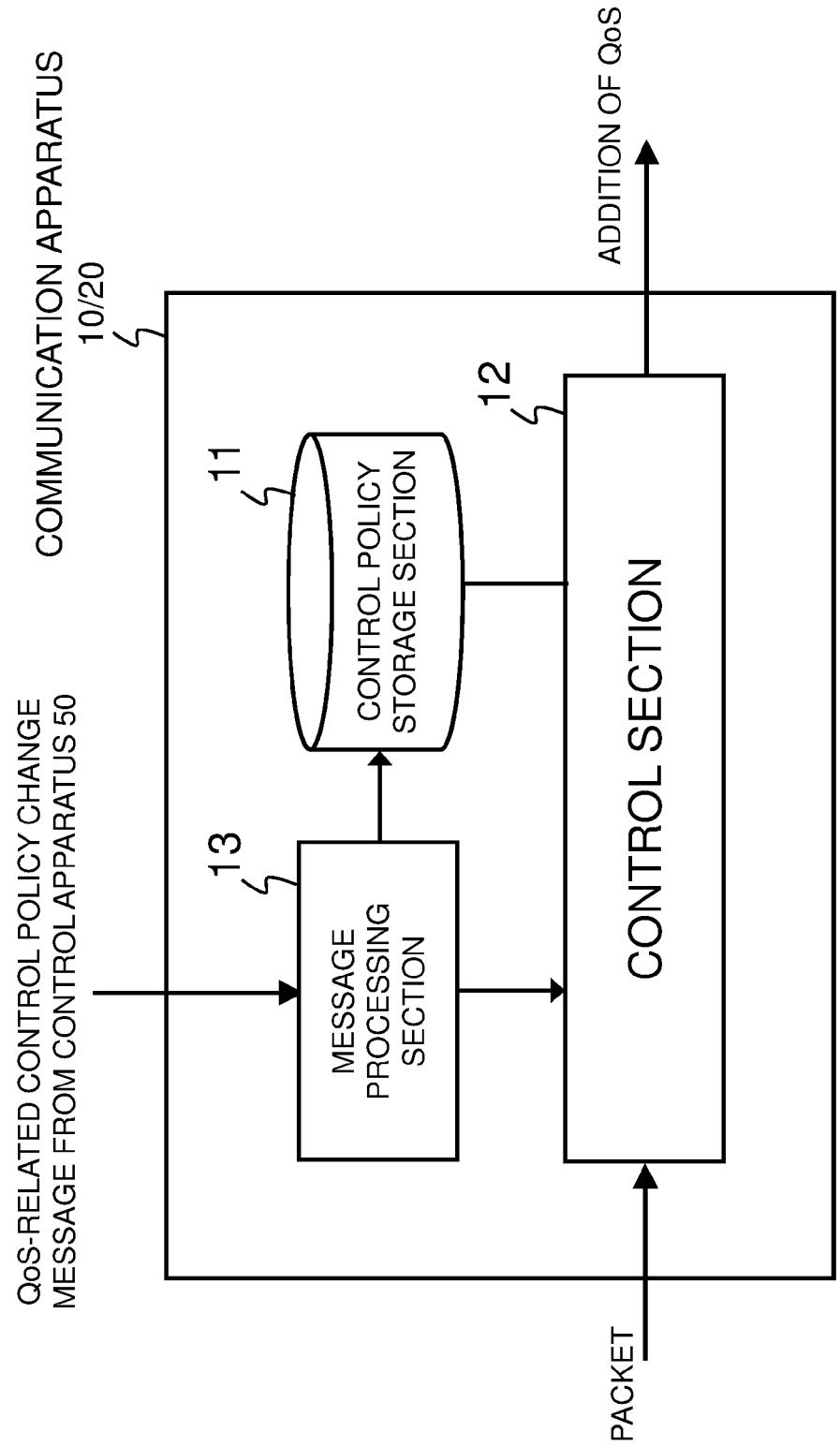
FIG. 3 is a block diagram showing the schematic configuration of a communication apparatus according to the first exemplary embodiment of the present invention.

Referring to FIG. 3, the communication apparatus 10/20 includes a storage section 11 that stores a control policy, a control section 12 that controls operations of the communication apparatus, and a message processing section 13 that receives messages notified from the control apparatus 50. However, FIG. 3 only shows the functions relevant to the present exemplary embodiment and omits other functions. The control section 12 gives QoS information to the outer header of a packet in accordance with the control policy stored in the storage section 11, whereby QoS information according to the control policy can be given to the logical path 30. The message processing section 13 can make a change in the control policy stored in the storage section 11 in accordance with a control message received from the control apparatus 50. Moreover, the message processing section 13 may instruct the control section 12 to give QoS information to a packet in accordance with a control message received from the control apparatus 50. A specific example of changing a QoS information-related control policy will be described later. Note that the functions of the control section 12 and message processing section 13 can also be implemented by executing programs stored in a memory (not shown) on a computer.

Figure 4:
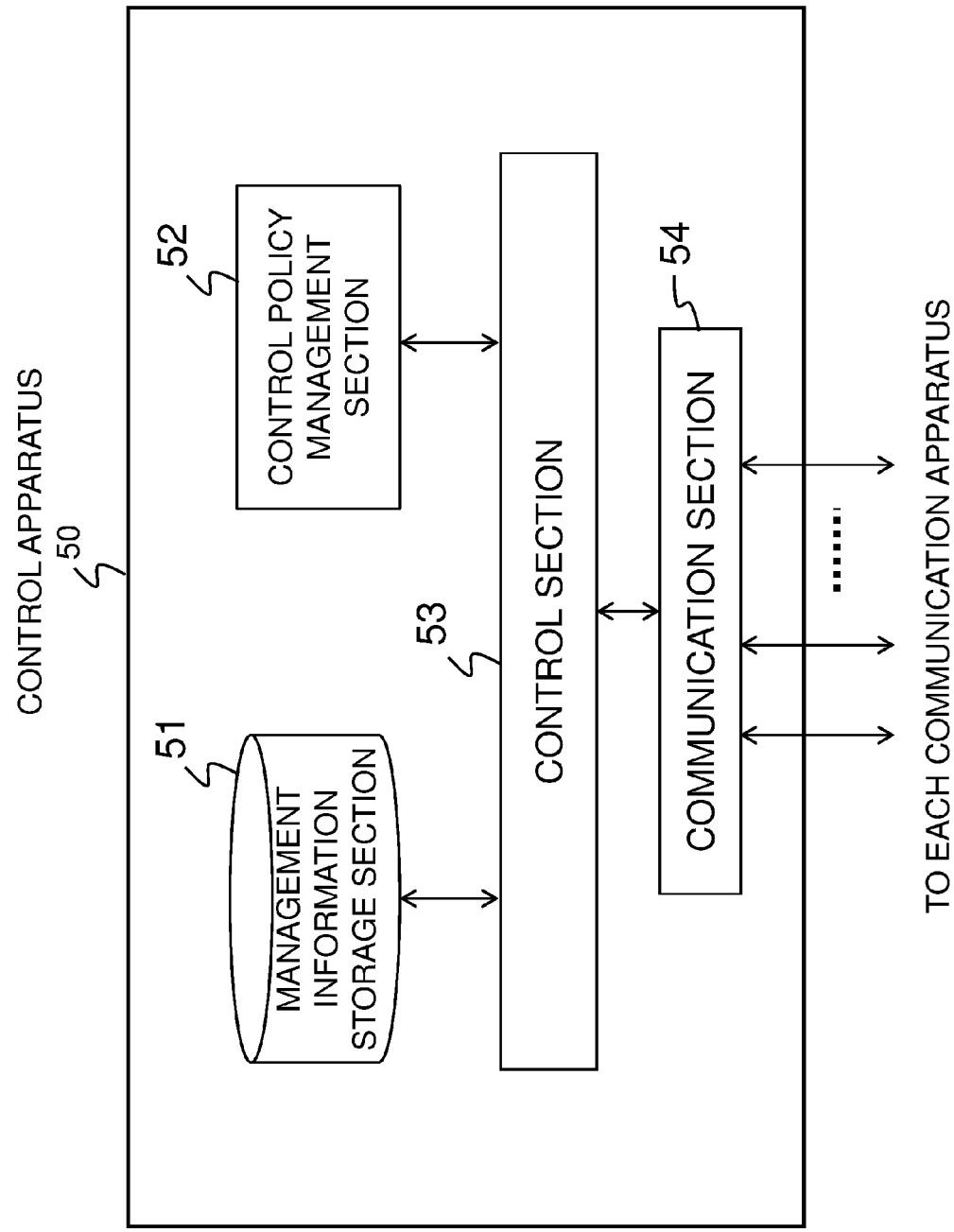
FIG. 4 is a block diagram showing the schematic configuration of a control apparatus according to the first exemplary embodiment of the present invention.

Referring to FIG. 4, the control apparatus 50 includes a management information storage section 51 that stores management information including the attributes of logical paths over a managed network and QoS information, which are associated with each other, a control policy management section 52 that controls control policy change for the communication apparatuses, a control section 53 that controls operations of the control apparatus 50, and a communication section 54 that performs communication with each communication apparatus. However, FIG. 4 only shows the functions relevant to the present exemplary embodiment and omits other functions. The control policy management section 52 manages the control policy of each communication apparatus by using the management information stored in the management information storage section 51, and can generate and send a control message to the communication apparatuses on the logical path via the communication section 54. Control messages are used to instruct the communication apparatuses 10 and 20 to change the control policy and to give QoS information to a packet in accordance with the control policy. Note that the functions of the control policy management section 52 and control section 53 can also be implemented by executing programs stored in a memory (not shown) on a computer.

1.2) Control Policy Change

First Example

Figure 5:
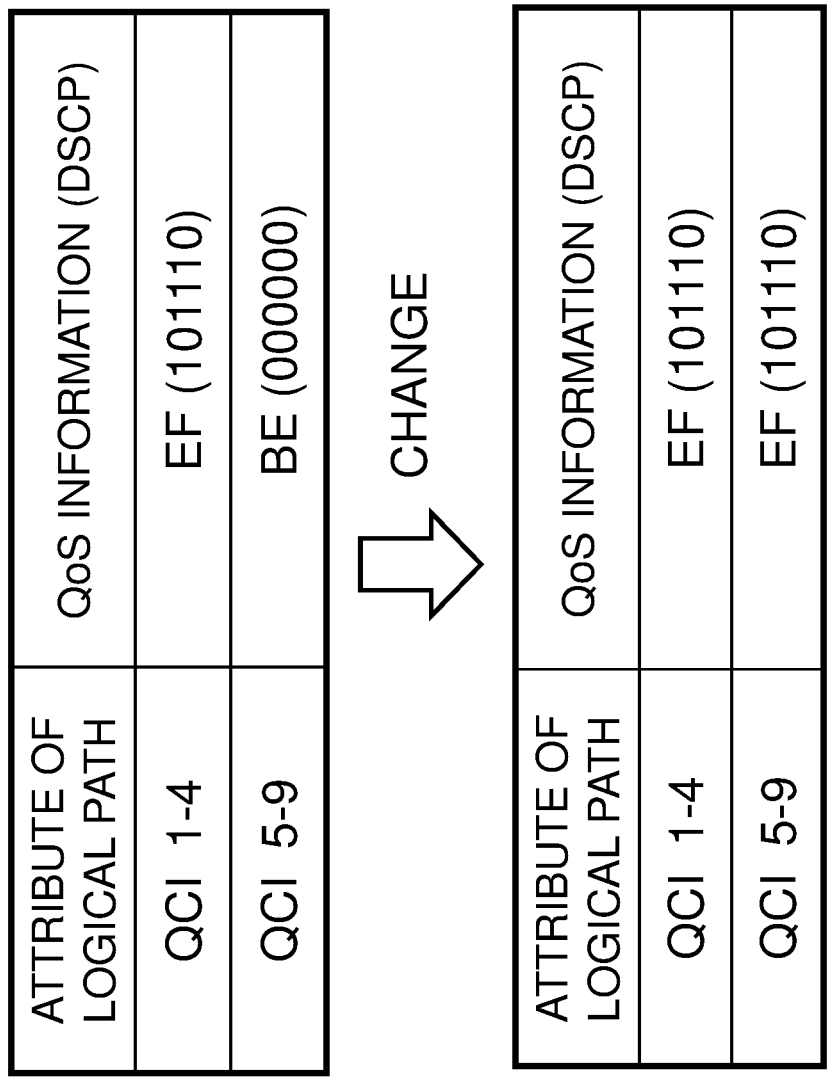
FIG. 5 is a schematic diagram showing a first example of control policy (management information) change in a service quality control method according to the first exemplary embodiment of the present invention.

In an example shown in FIG. 5, QCI values are used as the attribute of the logical path 30 and DSCP values are used as QoS information to be given to additional header information of a packet. Here, in the control policy before a change is made, bandwidth-guarantee types of QCI=1 to 4 are associated with EF (Expedited Forwarding), and non-bandwidth-guarantee types of QCI=5 to 9 are associated with best effort (BE). In the control policy after a change is made, both QCI=1 to 4 and QCI=5 to 9 are associated with EF. Accordingly, in this example, a logical path of QCI=5 initially transmits packets in which a DSCP value corresponding to BE is given as QoS information into additional header information but, after a change has been made in the control policy, transmits packets in which a DSCP value corresponding to EF is given to additional header information, whereby it is possible for the communication apparatuses to perform control with priorities changed.

Note that the control policy change shown in FIG. 5 is an example, and the associations between logical path attributes and QoS information to be given to the additional header can be changed at a desired level of granularity. Moreover, a change in the associations shown in FIG. 5 may be made conditionally. For example, a condition "QCI=1 and a predetermined destination address" is given, and a DSCP value is changed when this condition is met.

Second Example

Figure 6:
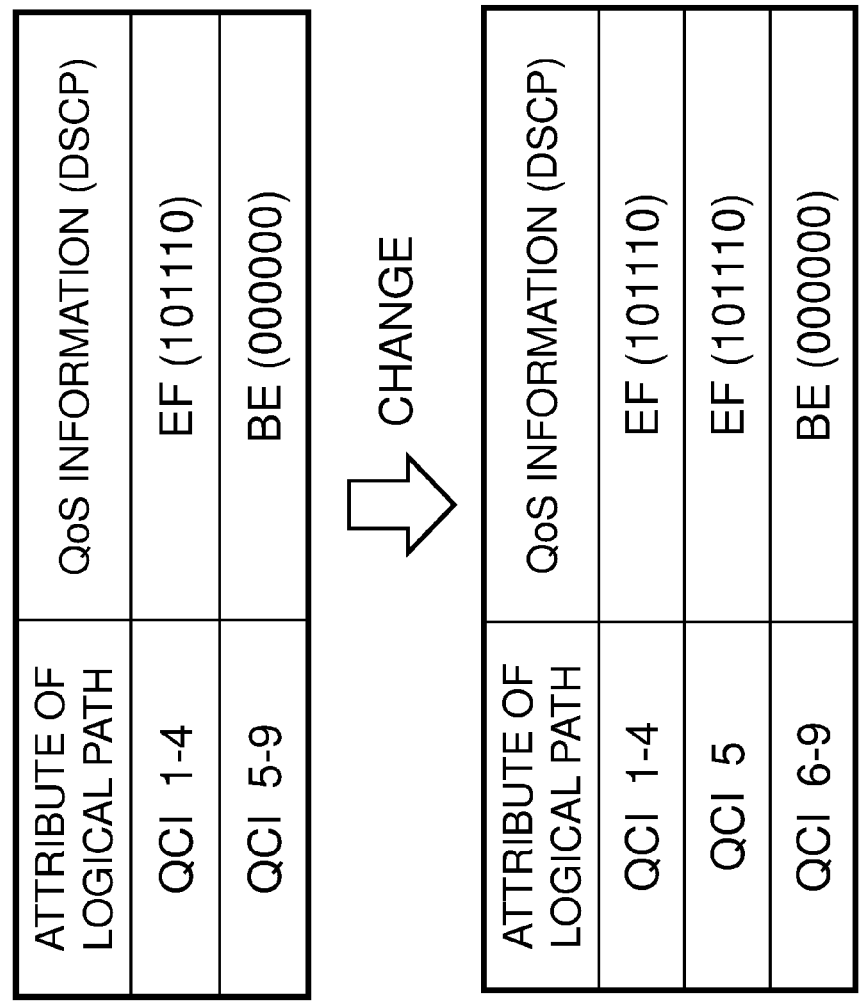
FIG. 6 is a schematic diagram showing a second example of control policy (management information) change in the service quality control method according to the first exemplary embodiment of the present invention.

In an example shown in FIG. 6, similarly to FIG. 5, QCI values and DSCP values are used for attributes of the logical path 30 and for QoS information to be given to the additional header information of a packet, respectively. Here, the control policy before a change is made is similar to that of FIG. 5, but in the control policy after a change has been made, part of the logical path 30 (only the logical path 30 corresponding to QCI=5 in the example of FIG. 5) is associated with EF and the other QCIs remain as before a change is made. A change is made in the associations between logical path attributes and QoS information to be given to the additional header as described above, whereby it is possible for the communication apparatuses to perform control with priorities changed.

Third Example

As another example of control policy change, it is also possible to change an operation rule based on agreement/ disagreement with a criterion. Hereinafter, a description will be given of a case of changing an operation rule, using QoS information associations similar to those of the above-described examples of change.

Figure 7:
FIG. 7 is a schematic diagram showing a third example of control policy (management information) change in the service quality control method according to the first exemplary embodiment of the present invention.

In an example shown in FIG. 7, a control policy includes criteria for identifying the logical path 30 and operation rules matching the criteria. In the example shown in FIG. 7, a control policy indicates that for a packet that agrees with an identification criterion, QoS information (e.g., DSCP) corresponding to the attribute (e.g., QCI) of the logical path 30 that agrees with the identification criterion is to be given to the additional header of the packet. Here, the control policy before a change is made indicates that a DSCP value of EF (Expedited Forwarding) shall be given to the additional header of a packet belonging to the logical path 30 that is identified with the criterion of destination address "A" and port number "a", and that a DSCP value of best effort (BE) shall be given to the additional header of a packet belonging to the logical path 30 that is identified with the criterion of destination address "B" and port number "b". The control policy after a change is made indicates that a DSCP value of EF shall be given to both a packet of destination address "A" and port number "a" and a packet of destination address "B" and port number "b". As in this example, based on the criteria for identifying the logical path 30, a change is made in the operation rules based on agreement/disagreement with each criterion, whereby it is possible for the communication apparatuses to perform control with priorities changed, as in the above-described first example of change.

Note that in the third example shown in FIG. 7, each communication apparatus operates in accordance with criterion-operation rule sets, which are set by the control apparatus 50, and accordingly, the third example can also be implemented in any system where a controller sets a criterion and an operation rule, such as, for example, an OpenFlow system, I2RS (Interface to the Routing System), or ForCES (Forwarding and Control Element Separation). Hereinafter, an example will be described in which the control apparatus 50 is configured based on OpenFlow system.

The control policy management section 52 of the control apparatus 50 manages, for each QCI, associated QoS information, for example, as in the example of FIG. 5. The control policy management section 52 generates control policies as illustrated in FIG. 7, based on the associations between QCIs and QoS information. The control policy management section 52 generates criteria for identifying the logical path 30 corresponding to the QCIs. In the example of FIG. 7, the control policy management section 52 generates criteria for identifying the logical path 30, based on the destination address and the port number of a packet. However, a method for generating criteria is not limited to the example of FIG. 7. For example, the control policy management section 52 can generate criteria by using L3/L4 layer information of the OSI reference model.

The control policy management section 52 generates operation rules each indicating that QoS information associated with a QCI corresponding to a generated criterion is to be given to the additional header of a packet.

The control policy management section 52 can make a change in the control policy by changing a criterion or an operation rule. The changed control policies are notified respectively to the communication apparatuses 10 and 20.

In a case where the control apparatus 50 is configured based on OpenFlow system, for example, the communication apparatuses 10 and 20 each have a function of processing a packet based on the control policies (including criteria and operation rules) generated by the control apparatus 50. This function is, for example, a switch function that can support the OpenFlow protocol. The switch function is, for example, a virtual switch configured by software.

Fourth Example

Figure 8:
FIG. 8 is a schematic diagram showing a fourth example of control policy (management information) change in the service quality control method according to the first exemplary embodiment of the present invention.

In some cases, a change may be made in control policy in consideration of an additional criterion based on other information than QCI. For example, as in an example of FIG. 8, the control apparatus 50 may refer to a QCI value and a destination address to change a control policy. In the example of FIG. 8, the control apparatus 50 changes the DSCP of a bearer of destination address "B", among bearers of QCI value "5", from "BE" to "EF". A change is made in control policy as in the example of FIG. 8, whereby it is possible to achieve finer QoS control than QoS control based on QCI values. Note that although FIG. 8 shows an example in which an additional criterion is a destination address, it is also possible to change a control policy, based on other information than a destination address. For example, a control policy may be changed based on a source address, a port number for a communication, or the like. Provision of the example of FIG. 8 makes it possible that the control apparatus 50 associates multiple pieces of QoS information with a QCI value (i.e., a logical path attribute).

1.3) System Operations

Figure 9:
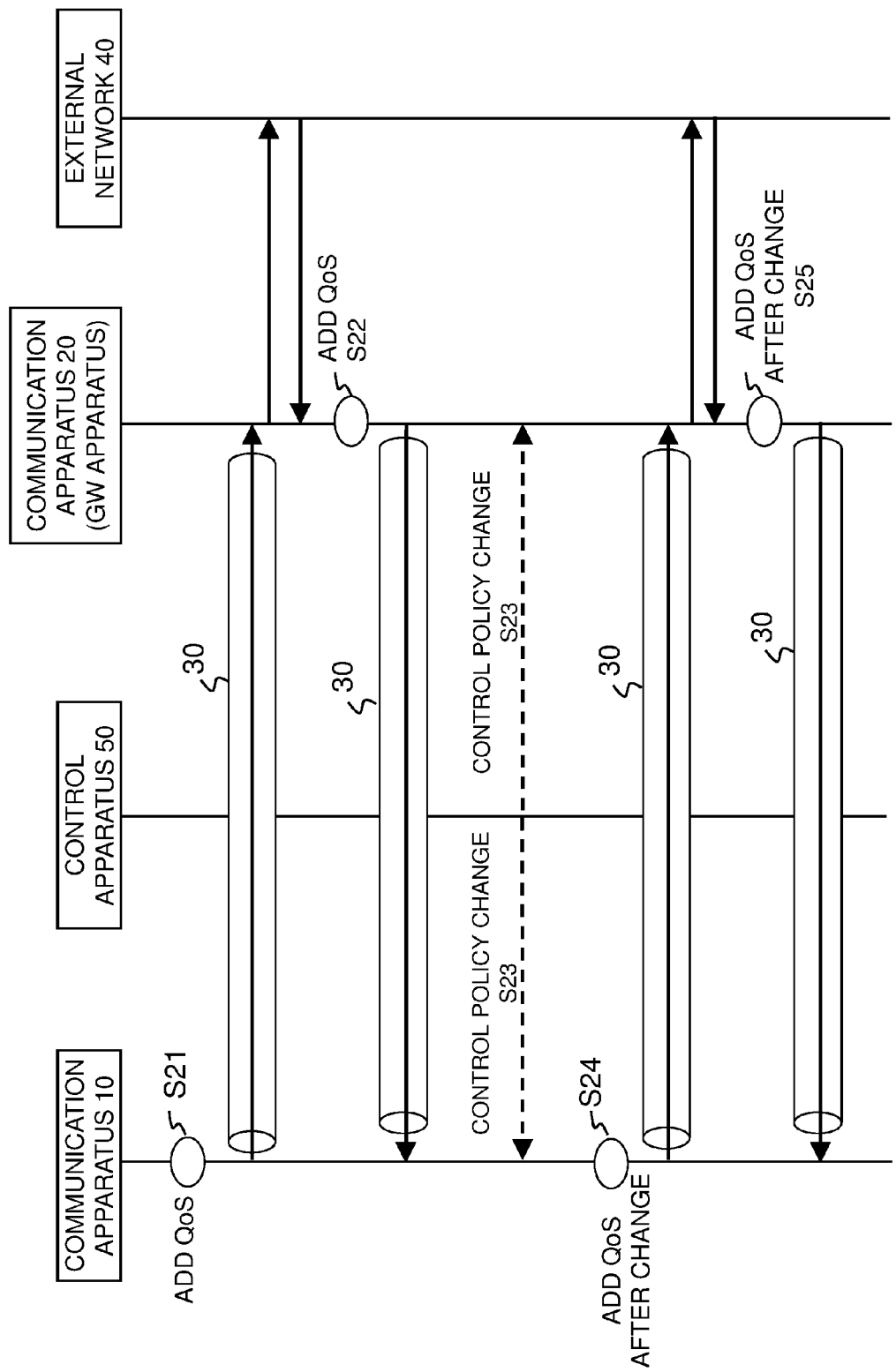
FIG. 9 is a sequence diagram showing an example of service quality control operations in the communication system according to the first exemplary embodiment of the present invention.

A description will be given of an example of operations in a case where radio communication equipment such as a mobile terminal communicates with the external network 40 via the communication apparatuses 10 and 20, with reference to FIG. 9. Referring to FIG. 9, the control section 12 of the communication apparatus 10 gives QoS information to a predetermined field of the additional header of a packet to be transmitted, in accordance with the control policy stored in the storage section 11 (Operation S21) and sends this packet to the communication apparatus 20 through the logical path 30. The control section 12 of the communication apparatus 20, when receiving the packet through the logical path 30, sends the packet to the external network 40 in accordance with a predetermined gateway function. On the other hand, when receiving a packet from the external network 40, the control section 12 of the communication apparatus 20 gives QoS information to the predetermined field of the additional header of the received packet in accordance with the control policy stored in the storage section 11 (Operation S22) and sends this packet to the communication apparatus 10 through the logical path 30.

The control policy management section 52 of the control apparatus 50, when making a change in the control policy, generates a control policy change message by using the management information in the management information storage section 51 and sends it to the communication apparatuses 10 and 20 (Operation S23).

When receiving the control policy change message, the control section 12 of each of the communication apparatuses 10 and 20 makes a change in the control policy stored in the storage section 11 and then, in accordance with the changed control policies, gives QoS information to the predetermined field of the additional header of a packet to be transmitted (Operation S24) and sends the packet to the communication apparatus 20. The control section 12 of the communication apparatus 20, when receiving a packet from the external network 40, gives QoS information to the predetermined field of the additional header of the received packet in accordance with the changed control policy stored in the storage section 11 (Operation S25) and sends this packet to the communication section 10 through the logical path 30.

1.4) Effects

As described above, according to the first exemplary embodiment of the present invention, since the control apparatus 50 manages the control policies of the communication apparatuses 10 and 20 in a changeable manner, each communication apparatus can give QoS information associated with the logical path 30 to additional header information of a packet in accordance with the control policy after a change is made. Accordingly, the communication apparatuses can accomplish flexible packet forward processing control such as priority control based on QoS information.

2. Second Exemplary Embodiment 2.1) System Architecture

Figure 10:
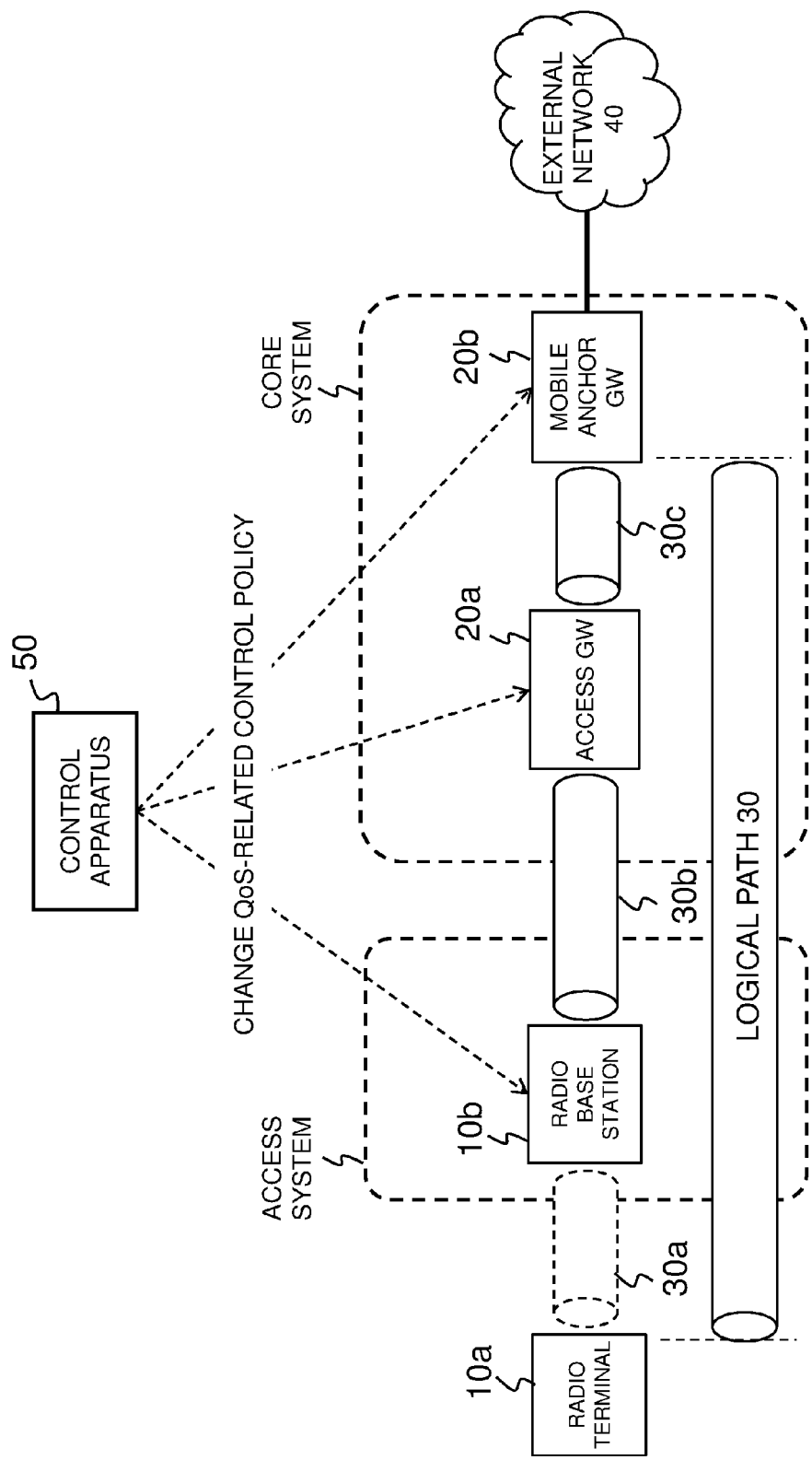
FIG. 10 is a schematic architecture diagram of a communication system according to a second exemplary embodiment of the present invention.

Referring to FIG. 10, in a communication system according to a second exemplary embodiment of the present invention, a radio terminal 10*a* can access an external network 40 through a higher-level logical path 30 (bearer), which is created across an access system and a core system. The radio terminal 10*a* is capable of wirelessly communicating with a radio base station 10*b* in the access system through a lower-level logical path 30*a* (radio channel). Moreover, a lower-level logical path 30*b* is created between the radio base station 10*b* and an access GW (gateway apparatus) 20*a* in accordance with control policies, and a lower-level logical path 30*c* is created between the access GW 20*a* and a mobile anchor GW 20*b* in accordance with control policies. The higher-level logical path 30 is formed of the lower-level logical paths 30*a*, 30*b* and 30*c* created between the radio terminal 10*a* and the mobile anchor GW 20*b*, whereby the radio terminal 10*a* can communicate with the external network 40.

According to the present exemplary embodiment, at least the lower-level logical paths 30*b* and 30*c* are each created by giving QoS information corresponding to the attribute of the higher-level logical path 30 to the additional header of a packet in accordance with the control policies. Accordingly, it is possible to change QoS information to be given to the additional header of a packet by using a control message from the control apparatus 50.

Each of the radio base station 10*b*, access GW 20*a*, and mobile anchor GW 20*b* has functions basically similar to those of the communication apparatus shown in FIG. 3, and the control apparatus 50 similarly has the functions shown in FIG. 4. Accordingly, a description thereof will be omitted. Moreover, a change can be made in the respective control policies of the radio base station 10*b*, access GW 20*a*, and mobile anchor GW 20*b* by using a QoS information-related control message from the control apparatus 50, and control policy change control is also similar to that of the above-described first exemplary embodiment. Accordingly, a description thereof will be omitted.

2.2) Operations

Next, operations in the communication system shown in FIG. 10 will be described with reference to FIG. 11. However, operations similar to those of the sequence shown in FIG. 9 are given the same reference signs, and a description will be simplified.

Referring to FIG. 11, the control apparatus 50, when making a change in the control policies, generates a control policy change message by using the management information in the management information storage section 51 and sends it to each of the radio base station 10*b*, access GW 20*a*, and mobile anchor GW 20*b* (Operation S23).

The radio base station 10*b*, when receiving the control policy change message, changes the control policy stored in the storage section 11 and then gives QoS information according to the changed control policy to the additional header of a packet received from the radio terminal 10*a* (Operation S24*a*) and sends it to the access GW 20*a* through the lower-level logical path 30*b*. The access GW 20*a* also similarly changes the control policy stored in the storage section 11, gives QoS information according to the changed control policies to the additional header of the packet received from the radio base station 10*b* (Operation S24*b*) and sends it to the mobile anchor GW 20*b* through the lower-level logical path 30*c*.

When receiving a packet from the external network 40, the mobile anchor GW 20*b* gives QoS information to a predetermined field of the additional header of the received packet in accordance with the changed control policies stored in the storage section 11 (Operation S25*a*) and sends this packet to the access GW 20*a* through the logical path 30*c*. The access GW 20*a* also similarly gives QoS information to the predetermined field of the additional header of the received packet in accordance with the changed control policy stored in the storage section 11 (Operation S25*b*) and sends this packet to the radio base station 10*b* through the logical path 30*b*. Thus, the radio terminal 10*a* can receive from the radio base station 10*b* the packet from the external network 40 through the radio channel 30*a*.

2.3) Effects

As described above, according to the second exemplary embodiment of the present invention, the radio base station 10*b*, access GW 20*a*, and mobile anchor GW 20*b*, when forwarding a packet through the lower-level logical paths, can give QoS information associated with the higher-level logical path to the additional header information of the packet in accordance with the respective control policies managed by the control apparatus 50. Accordingly, the radio base station 10*b*, access GW 20*a*, and mobile anchor GW 20*b* can accomplish flexible packet forward processing (such as priority control) based on QoS information.

3. Third Exemplary Embodiment 3.1) System Architecture

Referring to FIG. 12, it is assumed that a communication system according to a third exemplary embodiment of the present invention includes a communication system 1, an Internet 40 as an external network, and communication terminals 41 to 44, wherein the communication system 1 includes a mobile system 100, a backhaul network 200, and a control apparatus 50. The control apparatus 50 has functionality similar to that of the control apparatus 50 in the above-described first and second exemplary embodiments and therefore is given the same reference sign. However, the functional configuration inside the control apparatus 50 will be described more specifically by using FIG. 14.

The mobile system 100 includes an access system 101 and a core system 110. The access system 101 is a radio access network that provides communication terminals with connectivity to the communication system 1 by using a radio access scheme, and is assumed to include an access function management section 102 and access function sections 103 to 106. The access function management section 102 is an apparatus that manages access functions and performs monitoring of the states of the access functions such as alive monitoring, collection of various statistical information, and the like, in addition to making various settings on the access functions, including center frequency, radio wave strength, cell information, and the like. The access function sections 103 to 106 are radio access apparatuses that provide communication terminals with connectivity to the communication system 1 by using the radio access scheme. Note that the access function sections 103 to 106 correspond to eNBs in LTE (Long Term Evolution) system.

The core system 110 is a core network that provides a communication terminal having accessed the communication system 1 via the access system 101 with connectivity to the Internet 40, and includes a core function management section 111, an access GW 112 having access gateway functionality (C-plane), an access GW 113 having access gateway functionality (U-plane), and a mobile anchor function section 114.

The core function management section 111 is an apparatus that manages the apparatuses within the core system 110 and performs monitoring of their states such as alive monitoring, collection of various statistical information, and the like, in addition to making settings on each apparatus. The access GW 112 is a control apparatus performing control for communication terminals to receive mobile services via the access functions, including authentication, inter-access-function handover, and the like. Note that the access GW 112 corresponds to a MME in LTE system.

The access GW 113 is an access gateway apparatus that provides a bearer, which is a communication path for a communication terminal to perform data communication, and builds tunnels for forwarding packets with the access function sections 103 to 106 and with the mobile anchor function section 114 to provide a bearer. Note that the access GW 113 corresponds to a Serving GW in LTE system.

The mobile anchor function section 114 is a mobile anchor apparatus that terminates a bearer, which is a communication path for a communication terminal to perform packet communication, and builds a tunnel for forwarding packets with the access GW 113 to provide a bearer. Note that the mobile anchor function section 114 corresponds to a PDN GW in LTE system.

Moreover, the backhaul network 200 includes a packet forward function management section 201 and a plurality of packet forward sections 202 to 205. The packet forward function management section 201 is an apparatus that manages the packet forward sections within the backhaul network 200 and, for each packet forward section, performs setting of packet forwarding routes, settings for priority control based on QoS information set in the header of a data packet, monitoring of states such as alive monitoring, collection of various statistical information, and the like.

Each of the packet forward sections 202 to 205, when receiving a packet, retrieves a packet forward rule that has a matching key matching the received packet from a packet forward rule table, which stores packet forward rules, and performs processing (e.g., forwarding to a specified port, flooding, discarding, and the like) according to an action associated with that packet forward rule. Details of the control apparatus 50 will be described later.

FIG. 13 shows an example of the packet forward rule table. The packet forward rule table includes, for example, source address, destination address, DSCP field, and operation rule. A packet forward section identifies a received packet based on the source address, the destination address, and a value in the DSCP field of the received packet. That is, in the example of FIG. 13, source address, destination address, and DSCP field serve as criteria for identifying a received packet. The packet forward section, when the received packet meets the condition of an entry within the table, performs processing of the received packet according to the operation rule corresponding to that condition. For instance, in the case where the received packet meets the first entry of the table as shown in FIG. 13, the packet forward section forwards the packet from the port (1).

3.2) Control Apparatus

Referring to FIG. 14, the control apparatus 50 is configured by including a node communication section 501, a control message processing section 502, a route and action calculation section 503, a packet forward function management section 504, a topology management section 505, a node location information management section 506, a packet forward rule management section 507A, a packet forward rule database 507B, a logical path management section 508, and a packet forward rule statistical information management section 509. These individually operate as follows.

The node communication section 501 communicates with the access function sections 103 to 106, access GW 113, mobile anchor function section 114, and packet forward sections 202 to 205. The control message processing section 502 analyzes a control message received via the node communication section 501 and delivers control message information to relevant processing means within the control apparatus 50.

The route and action calculation section 503 calculates an action to be executed by a packet forward section on a packet forwarding route, based on the location information of a terminal, which is managed by the node location information management section 506, and topology information, which is configured by the topology management section 505. Moreover, when an update is made to associations between QoS information associated with higher-level logical path and QoS information associated with lower-level logical path, which are managed by the logical path management section 508, the route and action calculation section 503 notifies the association update to the access function sections 103 and 104, access GW 113, and mobile anchor function 114.

The packet forward function management section 504 manages capabilities (e.g., the number and types of ports, the types of supported actions, and the like) of the packet forward sections controlled by the control apparatus 50. The topology management section 505 configures network topology information, based on the connection relations among the packet forward sections, which are collected via the node communication section 501.

The node location information management section 506 manages information for locating a node connected to the backhaul network 200. Nodes managed by the node location information management section 506 include the access function sections 103 to 106, access GW 112 and access GW 113, and the like, which are connected to the backhaul network 200. In the present exemplary embodiment, it is assumed that a MAC address is used as information for identifying the connecting point of a node to the backhaul network 200, and information for identifying a packet forward section (e.g., the ID of a packet forward section) to which the node is connected and its port information are used as information for locating the node. However, it is also possible to use other information.

The packet forward rule management section 507A manages what packet forward rule is set in which packet forward section. Specifically, a result of calculation by the route and action calculation section 503 is registered as a packet forward rule in the packet forward rule database 507B, and the packet forward rule is set in a packet forward section. Moreover, registered information in the packet forward rule DB 507B is updated also when any change occurs to a packet forward rule set in a packet forward section due to a packet forward rule deletion notice or the like from the packet forward section.

Figure 15:
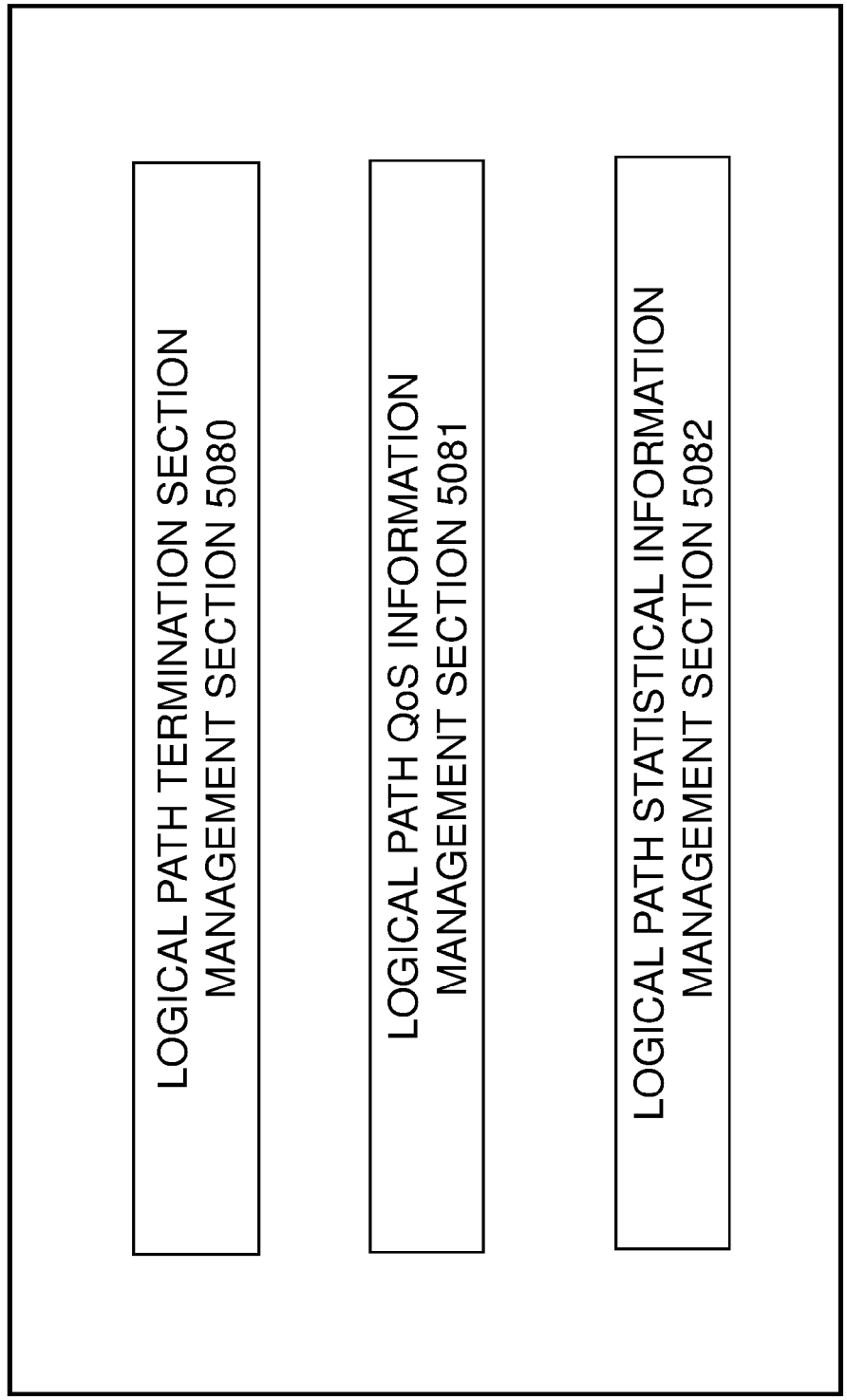
FIG. 15 is a schematic configuration diagram of a logical path management section according to the third exemplary embodiment of the present invention.

As illustrated in FIG. 15, the logical path management section 508 manages information concerning logical paths built in the mobile system 100 and, specifically, includes a logical path termination section management section 5080, a logical path QoS information management section 5081, and a logical path statistical information management section 5082.

The logical path termination section management section 5080 is a function of managing nodes that terminate logical paths, such as the access function sections and access GW 113, and includes the IP addresses of the nodes in the present exemplary embodiment.

The logical path QoS information management section 5081 manages associations between QoS information associated with higher-level logical path and QoS information associated with lower-level logical path. FIG. 16 shows an example of the information retained by the logical path QoS information management section.

Referring to FIG. 16, it is understood that the logical path QoS information management section 5081 manages higher-level logical path QoS information and lower-level logical path QoS information by associating them with traffic priorities. The higher-level logical path QoS information is QoS information associated with a logical path such as a bearer. The lower-level logical path QoS information is QoS information that is used for marking a field identifiable to the packet forward sections when a node terminating a logical path such as a bearer forwards a data packet after associating it with the logical path. In the present exemplary embodiment, the higher-level logical path QoS information and the lower-level logical path QoS information are assumed to be, but are not limited to, QCI and DSCP, respectively. As other examples of QoS information, APN (Access Point Name) and VLAN PCP (Virtual Local Area Network Priority Code Point), or the like, can be used for the higher-level logical path QoS information and the lower-level logical path QoS information, respectively. Note that the information sets retained by the logical path QoS information management section shown in FIG. 16 are an example, and information sets are not limited to these.

The logical path statistical information management section 5082 is a function of managing statistical information associated with logical paths such as bearers. FIG. 17 shows an example of information retained by the logical path statistical information management section.

Referring to FIG. 17, the logical path statistical information management section 5082 manages source terminal and destination terminal that terminate a lower-level logical path, QCI, maximum throughput, and throughput. Note that the information sets retained by the logical path statistical information management section shown in FIG. 17 are an example, and information sets are not limited to these.

Referring back to FIG. 14, the packet forward rule statistical information management section 509 manages statistical information associated with packet forward rules that are set in the packet forward functions. FIG. 18 shows an example of information retained by the packet forward rule statistical information management section 509.

Referring to FIG. 18, source terminal and destination terminal that terminate a lower-level logical path, DSCP, which is lower-level logical path QoS information, and throughput are managed. Note that the information sets retained by the packet forward rule statistical information management section 509 shown in FIG. 18 are an example, and information sets are not limited to these.

Note that in the above-described configuration, it is possible to omit the packet forward rule DB 507B if it is not necessary to store packet forward rules at the control apparatus 50. Moreover, it is also possible to employ a configuration in which the packet forward rule DB 507B is separately provided to an external server or the like. Furthermore, it is also possible to implement the control apparatus 50 with a configuration based on an OpenFlow controller to which the above-described logical path management section 508 is added.

3.3) Operations

Next, operations in the present exemplary embodiment will be described in detail with reference to FIGS. 19 to 24.
<Before Control Policy Change>

Figure 19:
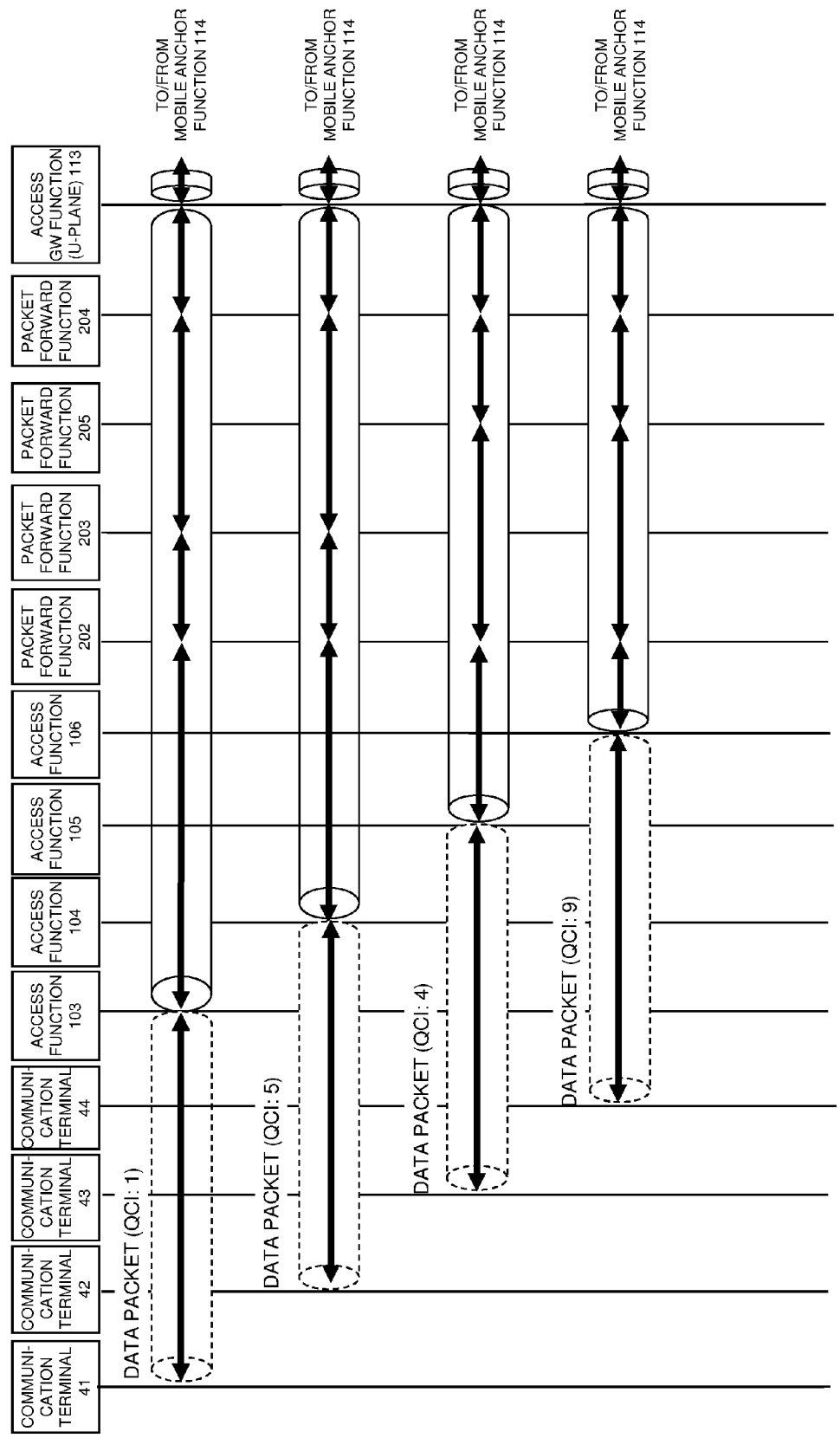
FIG. 19 is a diagram schematically showing an example of the configurations of logical paths based on management information before a change is made in control policies, which are managed by the control apparatus according to the third exemplary embodiment of the present invention.

First, FIG. 19 shows the communication states of the communication terminals 41 to 44 before a change is made in the association between QoS information associated with higher-level logical path and QoS information associated with lower-level logical path. However, FIG. 19 shows sequences between the communication terminals and the access GW 113 in order to facilitate the understanding of the points of the present exemplary embodiment, but the system shown in FIG. 12 is used in actuality. Moreover, it is assumed that marking of QoS information associated with lower-level logical path is performed by the access function sections 103 to 106 and access GW 113 when a data packet is forwarded, which is not explicitly shown in FIG. 19. Note that "marking" means, for example, to give QoS information (e.g., DSCP) to the header (outer header) that is given to a packet in order to create a tunnel.

Each communication terminal performs communication by using a single logical path. The communication terminal 41 performs communication by using a logical path of QCI "1" via the access function section 103. The communication terminal 42 performs communication by using a logical path of QCI "5" via the access function section 104. The communication terminal 43 performs communication by using a logical path of QCI "4" via the access function section 105. The communication terminal 44 performs communication by using a logical path of QCI "9" via the access function section 106.

Next, routes over the backhaul network 200 of data packets passing along the logical paths will be described. Two logical paths traveling between the access function section 103 and the access GW 113 and between the access function section 104 and the access GW 113 both pass along a route via the packet forward sections 202, 203 and 204. On the other hand, two logical paths traveling between the access function section 105 and the access GW 113 and between the access function section 106 and the access GW 113 both pass along a route via the packet forward functions 202, 205 and 204.

Next, a description will be given of marking of QoS information associated with lower-level logical path performed by the access function sections 103 to 106 and access GW 113 when a data packet is forwarded. In the communication states shown in FIG. 19, it is assumed that marking is performed by using the associations shown in FIG. 16. That is, of the logical paths shown in FIG. 19, the logical paths of QCI "1" and "4" use EF (101110) for a DSCP value, and the logical paths of QCI "5" and "9" use BE (000000) for a DSCP value. Note that it is assumed that a packet forward rule to preferentially control packets with a DSCP value of EF (101110) rather than packets with a DSCP value of BE (000000) has been set in the packet forward sections in the backhaul network 200 by the control apparatus 50.

Lastly, the statistical information managed by the control apparatus 50 will be described. Note that although logical paths of QCI "1", "5", "4", and "9" require 80 Mbps, 40 Mbps, 40 Mbps, and 80 Mbps, respectively, as respective desired throughputs of the logical paths in the present exemplary embodiment, it is assumed that the packet forward sections 203 and 205 have a link rate of 100 Mbps. Logical paths whose respective desired bandwidths are 80 Mbps, 40 Mbps, 40 Mbps, and 80 Mbps are built over 100-Mbps links. Accordingly, it is conceivable that the desired bandwidths cannot be achieved in part of the logical paths. Note that it is assumed that flooded traffic on a lower-priority logical path is discarded at a packet forward section on the route. First, FIG. 17 shows statistical information associated with logical paths such as bearers, which is managed by the logical path management section 508. Referring to FIG. 17, it can be understood that the throughputs of the lower-traffic-priority logical paths of QCI "5" and "9" are lower than their maximum throughputs and packets are therefore discarded.

Next, FIG. 18 shows statistical information associated with packet forward rules set in the packet forward sections, which is managed by the packet forward rule statistical information management section 509. Referring to FIG. 18, throughputs associated with the individual packet forward rules are indicated. In the present exemplary embodiment, since the granularity of logical paths and the granularity of packet forward rules are at similar levels, respective statistical information entries make one-to-one correspondences, but entries do not necessarily need to make one-to-one correspondences.

<Control Policy Change>

Next, a description will be given of a procedure in a case where the control apparatus 50 makes a change in the association between QoS information associated with higher-level logical path and QoS information associated with lower-level logical path, which are managed by the control apparatus 50, while the communication terminals 41 to 44 are performing communication in the communication system 1 shown in FIG. 12.

Figure 20:
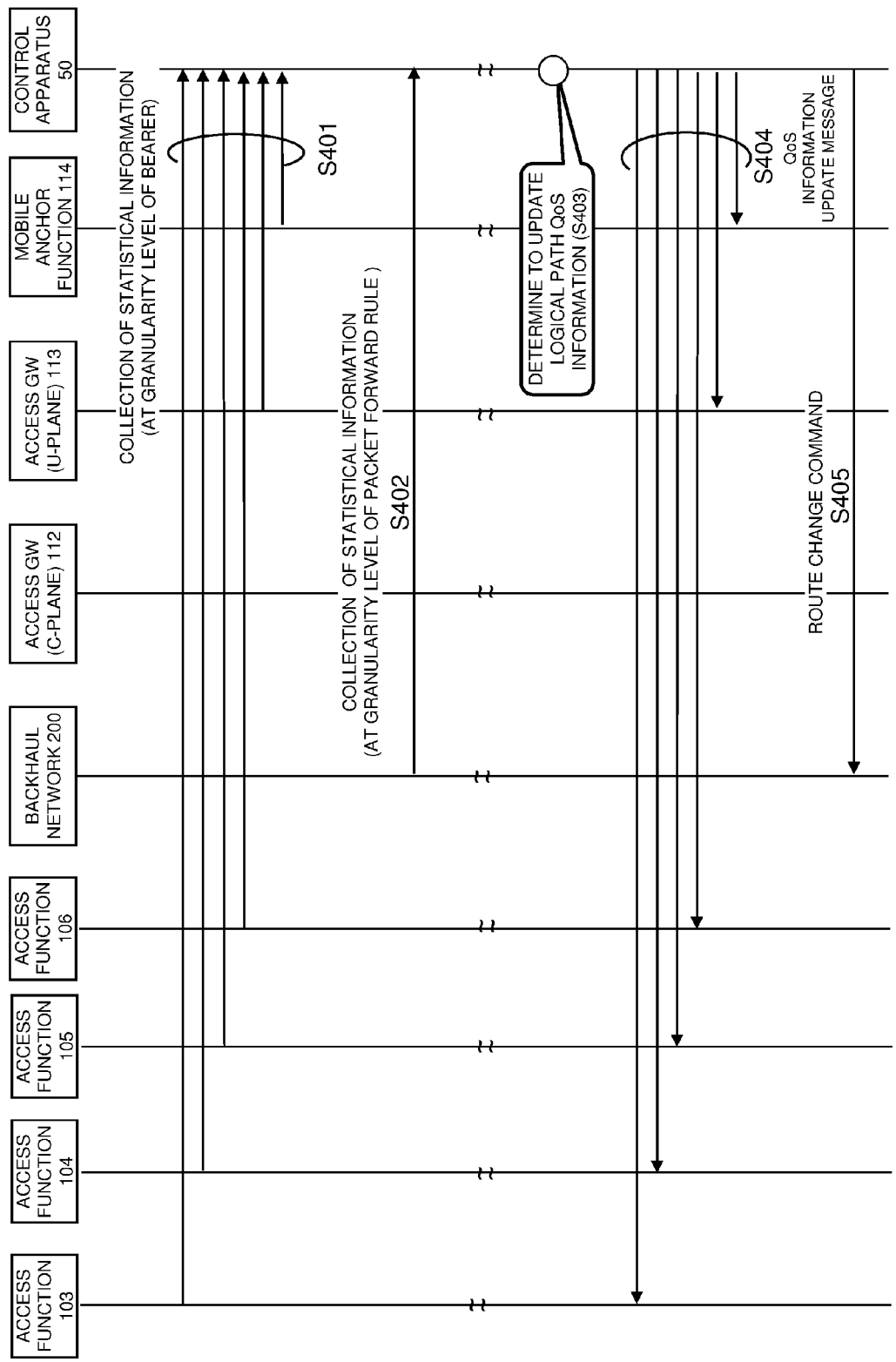
FIG. 20 is a sequence diagram for describing a trigger to change a control policy managed by the control apparatus according to the third exemplary embodiment of the present invention.

Referring to FIG. 20, the control apparatus 50, for example, periodically collects traffic statistical information at the granularity level of bearer and at the granularity level of packet forward rule (Operations S401 and S402). The statistical information at the granularity level of bearer is collected from the access function sections 103 to 106, access GW 113, and mobile anchor function section 114 and is managed, for example, in the form as shown in FIG. 17. The statistical information at the granularity level of packet forward rule is collected from the packet forward functions and is managed, for example, in the form as shown in FIG. 18.

The control apparatus 50, for example, refers to the collected statistical information and determines whether or not a change in the control policy is needed (Operation S403). For example, the control apparatus 50 refers to the statistical information and determines the state of the network (for example, whether or not congestion has occurred). For example, if congestion has occurred, the control apparatus 50 makes a change in the control policy so that QoS information (e.g., DSCP) corresponding to the QCI of a bearer suffering the congestion will have a value of higher priority. The change in the control policy causes a change in the association between QoS information (e.g., QCI) associated with higher-level logical path and QoS information (e.g., DSCP) associated with lower-level logical path. Moreover, it is also possible that the control apparatus 50 refers to statistical information that is collected after the change has been made in the control policy to check whether or not the congestion has been cleared. If the congestion has been cleared, the control apparatus 50, for example, returns the control policy to the contents before the change was made.

The above-described example illustrates that the control apparatus 50 makes a change in the control policy based on statistical information collected. However, a trigger for control policy change is not limited to the above-described example. For example, examples of a trigger for control policy change include the followings:
(A) Addition of a new service (addition of a new QCI value);
(B) Closing of an existing service (deletion of an existing QCI);
(C) Change of communication apparatus facilities (change of the type of QoS information); and
(D) Change in service priorities (change of a QCI-DSCP association).

The above-mentioned example (A) is an example in a case where a new communication service (e.g., communication for television conference) becomes available in the communication system and a new QCI value is assigned to a bearer belonging to this service. For example, it is assumed that a QCI value of "4" is assigned to a new service. In this case, the control apparatus 50 notifies the QCI assigned to the new service (QCI: "4") and QoS information corresponding this QCI (e.g., DSCP value: "EF") to the access function sections 103 to 106, access GW 113, and mobile anchor function section 114.

The above-mentioned example (B) is an example in a case where a QCI becomes disused due to closing of a communication service (e.g., communication for television conference) or the like. For example, assuming that a QCI value corresponding to a closed communication service is "4", the control apparatus 50 notifies the access function sections 103 to 106, access GW 113, and mobile anchor function section 114 that a QCI value of "4" and QoS information corresponding this QCI (e.g., DSCP value: "EF") are deleted from the control policies.

The above-mentioned example (C) is an example in a case where a network operator replaces the packet forward sections in the backhaul network 200 with new apparatuses. For example, it is conceivable that due to apparatus replacement, QoS information that can be used by packet forward sections before replacement cannot be used by new packet forward sections. For example, it is conceivable that the packet forward sections before replacement were able to use DSCP for QoS information, but the new packet forward sections cannot use DSCP. It is assumed that the new packet forward sections can use VLAN PCP. In this case, the control apparatus 50 changes QoS information corresponding to individual QCI values to VLAN PCP that can be used by the new packet forward sections. The control apparatus 50 determines VLAN PCP values corresponding to the individual QCI values and generates a new control policy. The control apparatus 50 notifies the generated control policy to the access function sections 103 to 106, access GW 113, and mobile anchor function section 114.

The above-mentioned example (D) is an example in a case where a network operator changes the priority of a communication service corresponding to QCI. For example, it is assumed that a network operator increases the priority of video streaming. For example, in response to the fact that the network operator has changed the priority, the control apparatus 50 changes a DSCP value corresponding to the QCI of video streaming (e.g., QCI "5") from BE to EF to increase the priority of video streaming. The control apparatus 50 notifies the access function sections 103 to 106, access GW 113, and mobile anchor function section 114 that a change is made in the control policy in accordance with the change of the DSCP value.

The control apparatus 50, when detecting a trigger for control policy change, refers to an IP address list retained by the logical path termination section management section in the logical path management section 508 and notifies an update of the QoS information association to the access function sections 103 to 106, access GW 113, and mobile anchor function section 114 (Operation S404).

It is assumed that the update of the QoS information association is made so that the priority of traffic over a logical path of QCI "4" will be lowered, while the priority of traffic over a logical path of QCI "5" will be heightened. FIG. 21 shows the association between QoS information associated with higher-level logical path and QoS information associated with lower-level logical path after the change has been made.

Subsequently, the control apparatus 50 checks the state of traffic after the change has been made in the QoS information association, by using the management information shown in FIGS. 17, 18, and 21. As a result, it is found that data packets with higher traffic priority are lost in the backhaul network 200 because the routes of two higher-traffic-priority logical paths between the access function section 103 and the access GW 113 and between the access function section 104 and the access GW 113 are overlapped. Accordingly, the control apparatus 50 recalculates routes within the backhaul network 200 for the logical paths to travel along. As a result, it is determined to change the route of the logical path of QCI "5" traveling between the access function section 104 and the access GW 113 and the route of the logical path of QCI "4" traveling between the access function section 105 and the access GW 113. Specifically, routes are selected such that the logical path of QCI "5" traveling between the access function section 104 and the access GW 113 will travel along a route via the packet forward sections 202, 205 and 204, and the logical path of QCI "4" traveling between the access function section 105 and the access GW 113 will travel along a route via the packet forward functions 202, 203 and 204.

The control apparatus 50 sends a route change command to the packet forward sections 202 to 205 to reflect the results of route recalculation (Operation S405 in FIG. 20).

Figure 24:
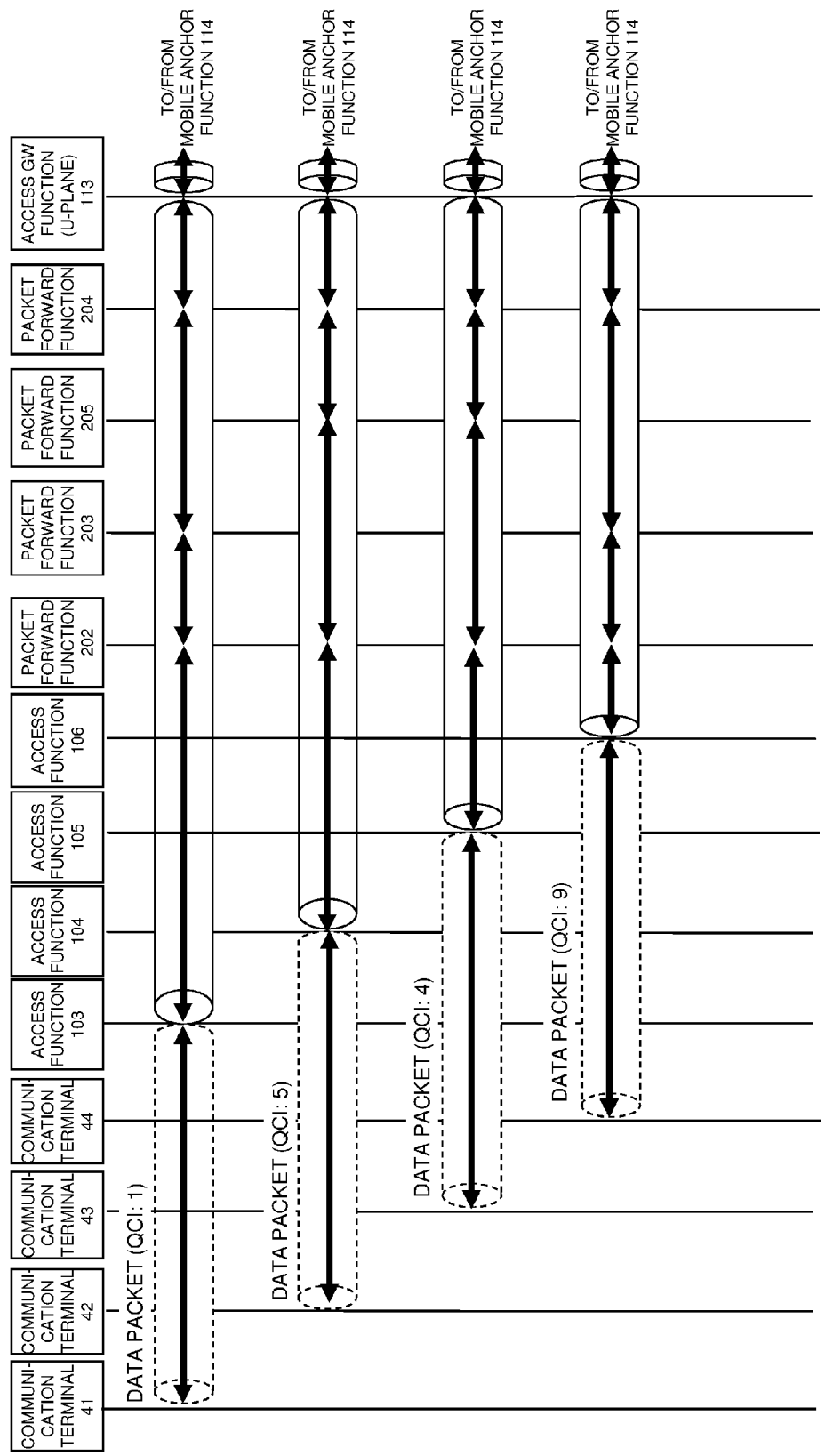
FIG. 24 is a diagram schematically showing an example of the configurations of logical paths based on management information after a change is made in the control policies, which are managed by the control apparatus according to the third exemplary embodiment of the present invention.

FIGS. 22 to 24 show the communication states of the communication terminals 41 and 42 and various statistical information results after the routes have been changed. It is understood from them that data packets with higher traffic priority can maintain desired throughputs even after the change has been made in the association between QoS information associated with higher-level logical path and QoS information associated with lower-level logical path.

In the present exemplary embodiment, a description is given of a case where the control apparatus 50 directly controls nodes such as the access function sections, access GW (U-plane), and packet forward sections. However, the control apparatus 50 may indirectly control them. Indirect control may be the control performed via an apparatus equivalent to EMS or NMS, such as the access function management section 102 or the core function management section 111. Moreover, the access function management section 102 or the core function management section 111 corresponding to EMS or NMS may include the functionality of the control apparatus 50.

Furthermore, the above-described functions of the control apparatus 50 may be implemented all within a single physical apparatus, or may be implemented in a divided manner on a plurality of physical apparatuses.

3.4) Effects

As described above, according to the third exemplary embodiment of the present invention, association between QoS information associated with higher-level logical path and QoS information associated with lower-level logical path and path control in a backhaul network are managed by a control apparatus in a centralized manner. Accordingly, it is possible to dynamically change the priorities of data packets being communicated.

4. Fourth Exemplary Embodiment

According to the above-described exemplary embodiments, it is illustrated that the control apparatus 50 instructs apparatuses serving as the endpoints of a bearer (the communication apparatuses 10 and 20, access function sections, access GW, mobile anchor function sections, and the like) to make a change in the control policy. In contrast, according to a fourth exemplary embodiment of the present invention, the control apparatus 50 instructs a node different from the apparatuses serving as the endpoints of a bearer to make a change in the control policy. The node which is instructed to make a change in the control policy gives QoS information to the outer header of a packet in accordance with the changed control policy. Accordingly, apparatuses serving as the endpoints of a bearer do not need to have an interface function or the like for receiving a control policy change command from the control apparatus 50.

Employment of the architecture according to the fourth exemplary embodiment enables a network operator to avoid adding a function of interfacing with the control apparatus 50 by change, modification and the like of existing apparatuses serving as the endpoints of a bearer. That is, a network operator can take advantages of the present invention while using existing apparatuses in its communication systems as they are. A network operator can dynamically change QoS information by deploying a node having a function of interfacing with the control apparatus 50 in part of its communication system.

Figure 25:
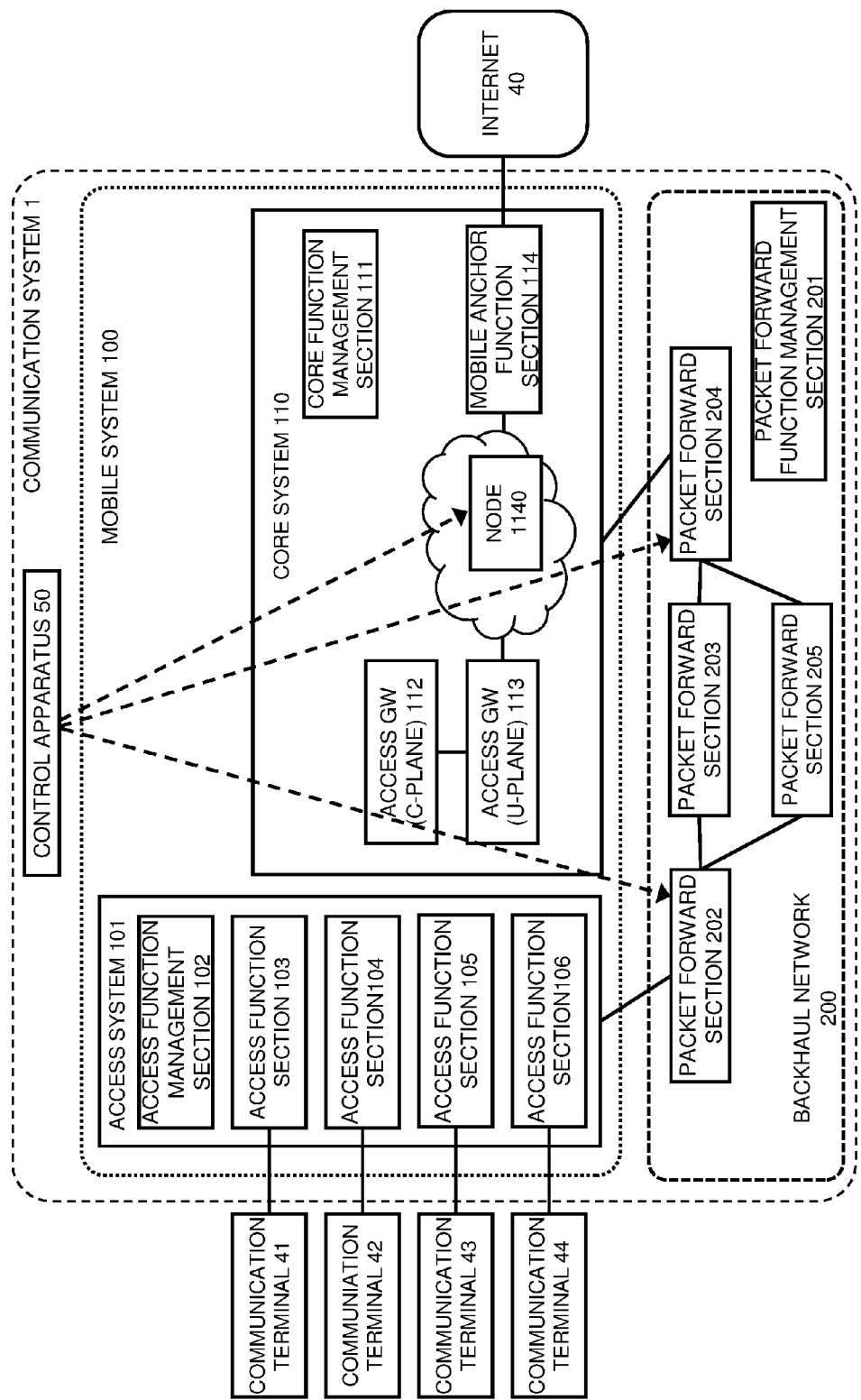
FIG. 25 is a schematic architecture diagram of a communication system according to a fourth exemplary embodiment of the present invention.

FIG. 25 shows an example of the system architecture according to the fourth exemplary embodiment. For example, the control apparatus 50 instructs a node 1140 deployed in the core system 110 and the packet forward sections in the backhaul network 200 to make a change in the control policy. The node 1140 and packet forward sections each have a function of giving QoS information to the outer header (e.g., the function illustrated in FIG. 3) in accordance with an instruction from the control apparatus 50. This function does not need to be provided to all packet forward sections in the backhaul network 200 and all nodes 1140 in the core system 110, but it is sufficient that some packet forward sections and nodes 1140 include this function.

Figure 26:
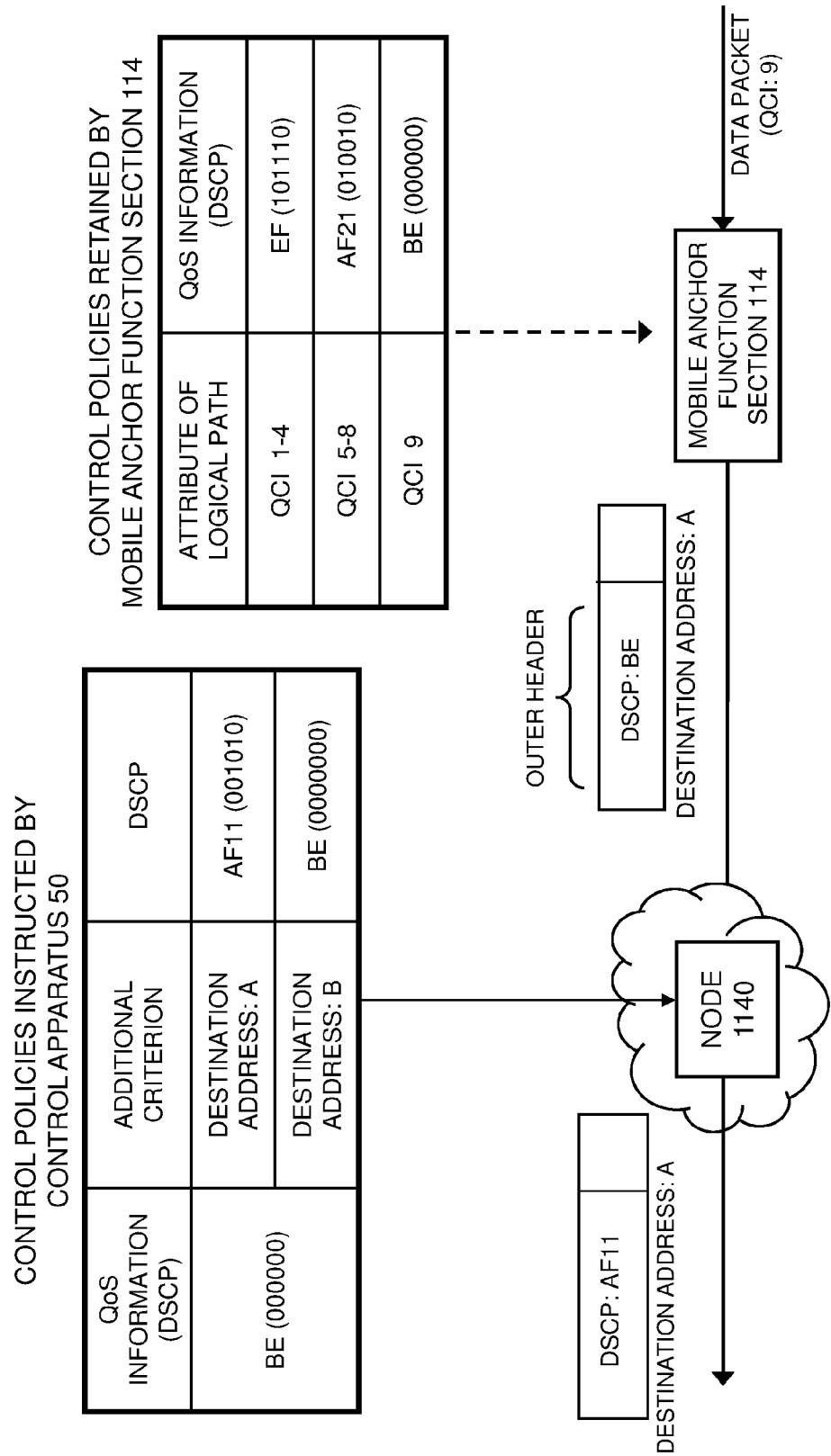
FIG. 26 is a diagram showing an example of operations according to the fourth exemplary embodiment of the present invention.

As shown in an example of FIG. 26, the control apparatus 50 may instruct the node 1140 and packet forward sections to be provided with policies different from the control policies retained by apparatuses serving as the endpoints of a bearer. For example, a packet forward section having a function of performing QoS control in accordance with control policy notified from the control apparatus 50 is deployed at an edge where the backhaul network 200 and the core system are connected. Moreover, in a network of the core system 110, for example, the node 1140 is deployed at an edge that is a connection point with the mobile anchor function section 114.

In the example of FIG. 26, it is assumed that control policy was set in the mobile anchor function section 114, for example, at the time of construction of the communication system or the like. The mobile anchor function section 114 identifies a received data packet and determines that it has the attribute of a QCI value of "9". The mobile anchor function section 114 gives a DSCP corresponding the QCI to the outer header of this data packet in accordance with the control policy. In the case of FIG. 26, since the QCI value is "9", a DSCP value of "BE" is given to the outer header.

The control apparatus 50 notifies the control policy to the node 1140. The control policy notified from the control apparatus 50 includes an additional criterion as a rule for identifying a control target, in addition to DSCP, which is QoS information. That is, even if packets have the same DSCP value, different DSCPs may be newly given to the outer headers of the packets. In the example of FIG. 26, the additional criterion is the destination address of a packet. In the example of FIG. 26, since the destination address of the data packet is "A", the node 1140, in accordance with the control policy, changes the DSCP value ("BE") given in the outer header to a value according to the additional criterion ("AF11").

QoS information is controlled as in FIG. 26, whereby it is possible to achieve finer QoS control than control based on QCI values corresponding to the attributes of logical paths to which packets belong.

Figure 27:
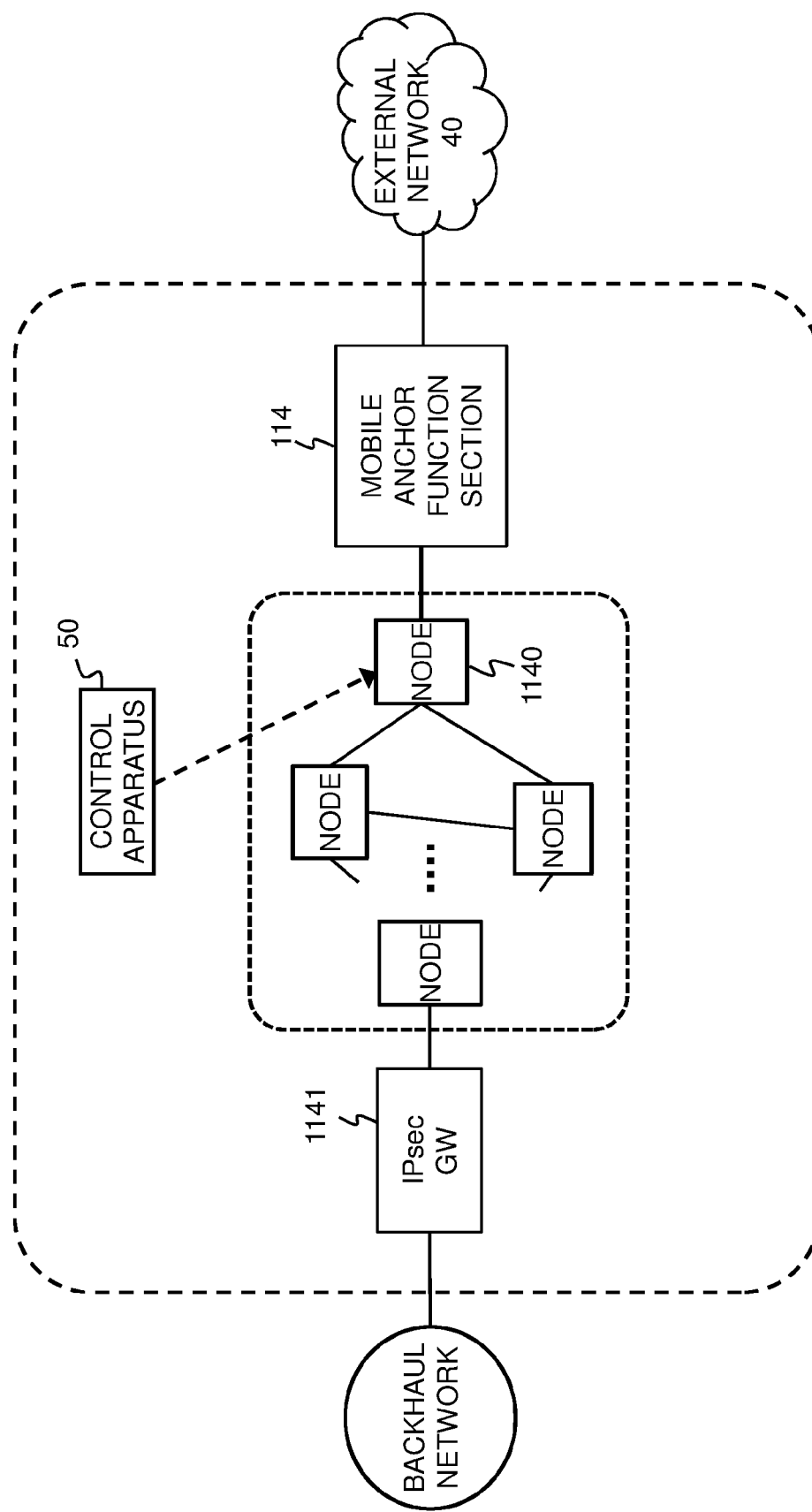
FIG. 27 is a schematic architecture diagram of a communication system according to the fourth exemplary embodiment of the present invention.

FIG. 27 shows another example of the architecture according to the fourth exemplary embodiment. An IPsec GW 1141 is deployed in a mobile communication system to encrypt communications in some cases, as shown in the example of FIG. 27. If a communication is encrypted by the IPsec GW 1141, a node 1140 cannot read information in fields other than the outer header of a packet, possibly resulting in the node 1140 being unable to identify a bearer. If the node 1140 or a packet forward section cannot identify a bearer, QoS control possibly cannot be performed in accordance with the control policy.

Accordingly, in a case where the IPsec GW 1141 is deployed, the node 1140 is deployed at a location where the effect of communication encryption by the IPsec GW 1141 can be avoided, as in the example of FIG. 27, whereby it is possible to perform the QoS control of the present invention even in a system in which the IPsec GW 1141 exists. Note that in a case where the IPsec GW 1141 encrypts a packet, QoS information given by the node 1140 is carried on as QoS information used in the outer header after encryption.

For example, the node 1140 is deployed at a location where it is possible to perform QoS control in accordance with the control policy before encryption is carried out by the IPsec GW 1141. For example, the node 1140 is deployed in a network between the mobile anchor function section 114 and the IPsec GW 1141. In the network between the mobile anchor function section 114 and the IPsec GW 1141, for example, the node 1140 is deployed at the edge where this network and the mobile anchor function section 114 are connected. The node 1140, in accordance with an instruction from the control apparatus 50, gives QoS information to a packet and forwards the packet to the IPsec GW 1141. However, a location where the node 1140 is deployed is not limited to such an edge of the network. The node 1140 may be deployed any location in the network between the mobile anchor function section 114 and the IPsec GW 1141.

Note that the configuration of the node 1140 is similar to the configuration of the communication apparatus illustrated in FIG. 3, and a detailed description thereof will be omitted.

5. Examples

Hereinafter, specific examples of application of the above-described third exemplary embodiment (FIG. 12) will be provided. Blocks having functions similar to those of the constituent blocks shown in FIG. 12 are given the same reference signs, and a detailed description thereof will be omitted. Note that reference sign correspondences between the third exemplary embodiment (FIG. 12) and the examples are shown in FIG. 32.

5.1) First Example (EPS: Evolved Packet System)

Figure 28:
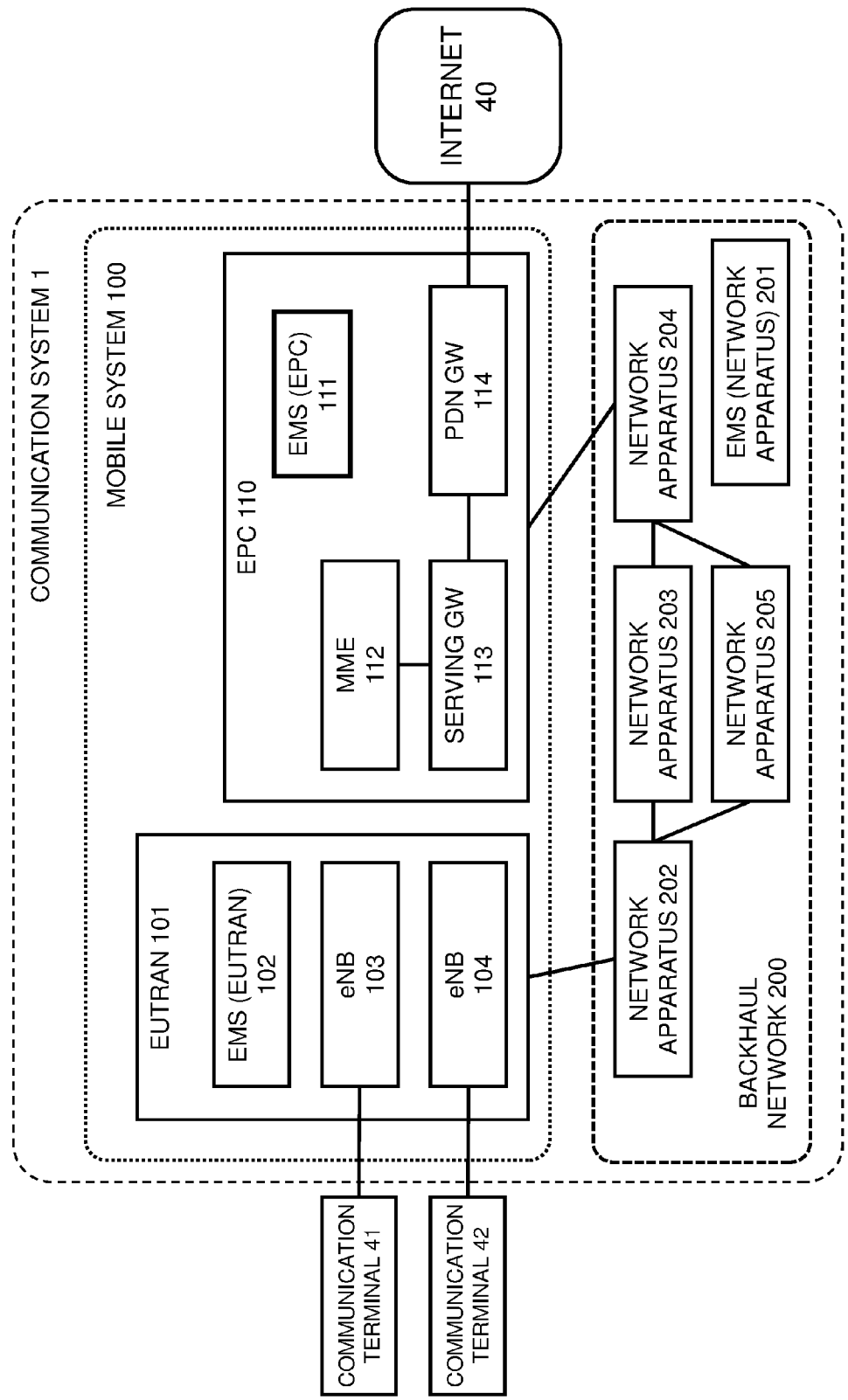
FIG. 28 is a schematic block diagram showing the more detailed architecture of a communication system (EPS) according to a first example of the present invention.

Referring to FIG. 28, an EPS system according to a first example of the present invention includes a communication system 1, an Internet 40 as an external network, and communication terminals 41 and 42, wherein the communication system 1 includes a mobile system 100 and a backhaul network 200, wherein the mobile system 100 includes an EUTRAN 101, which is an access system, and an EPC 110, which is a core system. The functionality of the control apparatus 50 in the third exemplary embodiment shown in FIG. 12 is included in an EMS (Element Management System) 111 within the EPC 110 in the present example.

The EUTRAN 101 is a radio access network that provides the communication terminals with connectivity to the communication system 1 by using an LTE radio access scheme, and includes an EMS 102 and eNBs 103 and 104. The EMS 102 is an apparatus managing the eNBs and performs monitoring of eNB states such as alive monitoring, collection of various statistical information, and the like, in addition to making various settings on the eNBs, including center frequency, radio wave strength, cell information, and the like. The eNBs 103 and 104 are radio access apparatuses that provide the communication terminals with connectivity to the communication system 1 by using LTE.

The EPC 110 is a core network that provides a communication terminal having accessed the communication system 1 via the EUTRAN 110 with connectivity to the Internet 40 and includes the EMS 11, a MME 112, a Serving GW 113, and a PDN GW 114.

The EMS 111 is an apparatus managing the apparatuses within the EPC 110 and performs monitoring of their states such as alive monitoring, collection of various statistical information, and the like, in addition to making settings on the apparatuses. Moreover, the EMS 111 in the present example incorporates a functional configuration equivalent to that of the control apparatus 50 shown in FIG. 4 and performs control policy management as described already.

The MME 112 is a control apparatus performing control for the communication terminals to receive mobile services via the eNBs, such as authentication and inter-eNB handover. The Serving GW 113 is an access GW that provides a bearer, which is a communication path for a communication terminal to perform data communication, and builds a tunnel for forwarding packets with each of the eNBs and PDN GW to provide a bearer. The PDN GW 114 is a mobile anchor apparatus that terminates a bearer, which is a communication path for a communication terminal to perform packet communication, and builds a tunnel for forwarding packets with the Serving GW 113 to provide a bearer.

The backhaul network 200 includes an EMS 201 and network apparatuses 202 to 205. The EMS 201 is an apparatus managing the network apparatuses within the backhaul network 200 and, for each network apparatus, performs setting of packet forwarding routes, settings for priority control based on QoS information set in the header of a data packet, monitoring of states such as alive monitoring, collection of various statistical information, and the like. The network apparatuses 202 to 205 perform data packet forward processing and priority control processing based on the contents of settings made by the EMS 111.

According to the first example of the present invention, the EMS 111 within the EPC 110 has the same functionality as the control apparatus 50 of the third exemplary embodiment. Accordingly, when a change is made in the control policy, the EMS 111 generates a control policy change message and sends it to each of the eNBs, Serving GW 113, PDN GW 114, and EMS 201. Each of the eNBs, Serving GW 113, and PDN GW 114 having received the control policy change message changes the control policy and gives QoS information according to the changed control policy to the additional header of a packet. The EMS 201 in the backhaul network 200, for each network apparatus, performs setting of packet forwarding routes and settings for priority control based on QoS information set in the header of a data packet. Each network apparatus performs data packet forward processing and priority control processing based on the contents of settings made by the EMS 111. Note that it is also possible that control policy management for the eNBs is performed by a SON (Self Organizing Network) server connected to the eNBs.

5.2) Second Example (GPRS: General Packet Radio Service)

Figure 29:
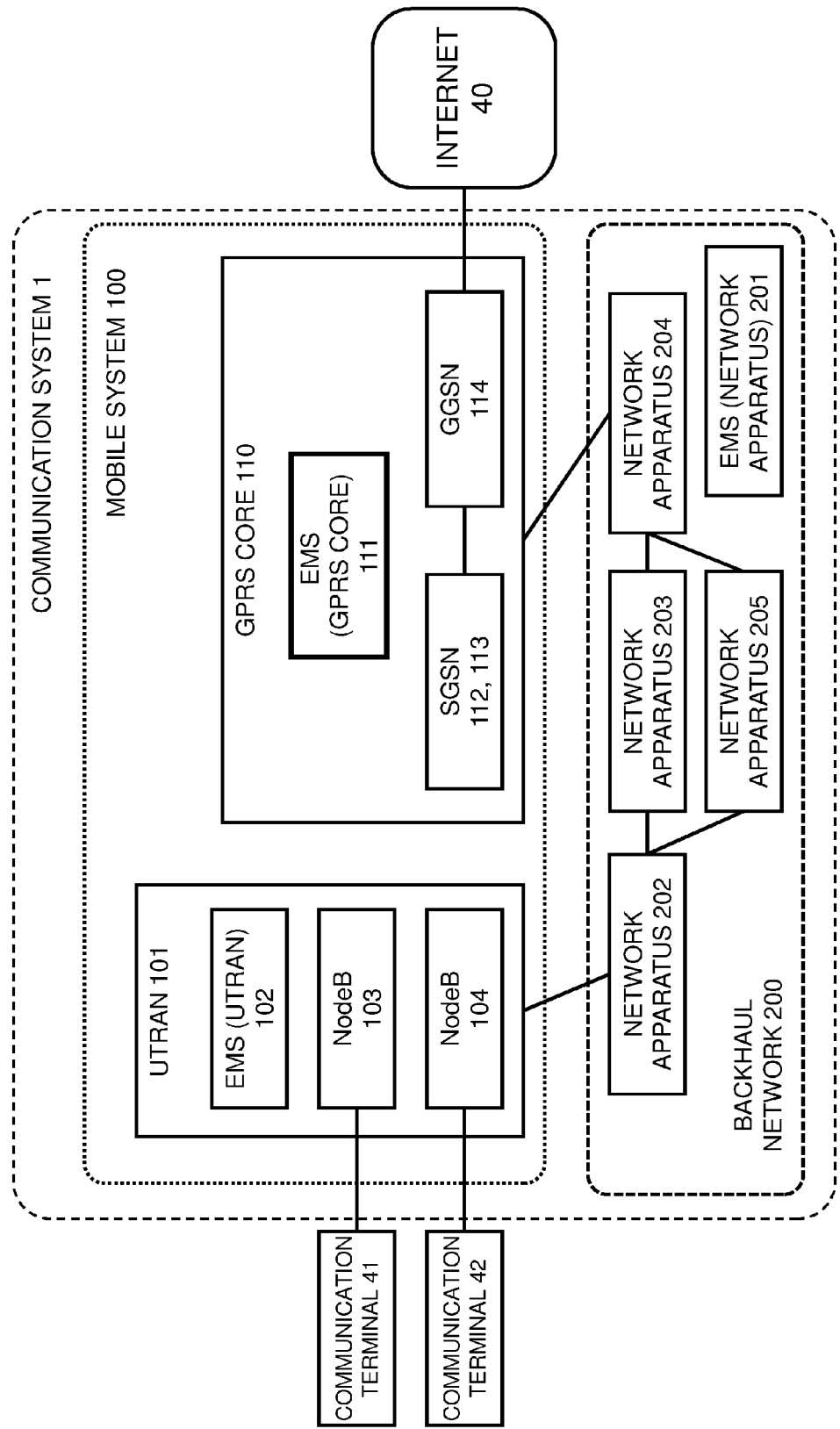
FIG. 29 is a schematic block diagram showing the more detailed architecture of a communication system (GPRS) according to a second example of the present invention.

Referring to FIG. 29, a mobile system 100 in a GPRS system according to a second example of the present invention includes a UTRAN 101, which is an access system, and a GPRS Core 110, which is a core system. The functionality of the control apparatus 50 in the third exemplary embodiment shown in FIG. 12 is included in an EMS 111 within the GPRS Core 110 in the present example.

The UTRAN 101 includes an EMS 102, which is an access function management section, and NodeBs 103 and 104, which are access function sections, while the GPRS Core 110 includes the EMS 111, which is a core function management section, SGSNs (Serving GPRS Support Nodes) 112 and 113, which correspond to access GWs, and a GGSN (Gateway GPRS Support Node) 114, which corresponds to a mobile anchor function section. A backhaul network 200 is similar to that of the first example, and therefore a description thereof will be omitted.

5.3) Third Example (3GPP2 cdma 1×/EVDO)

Figure 30:
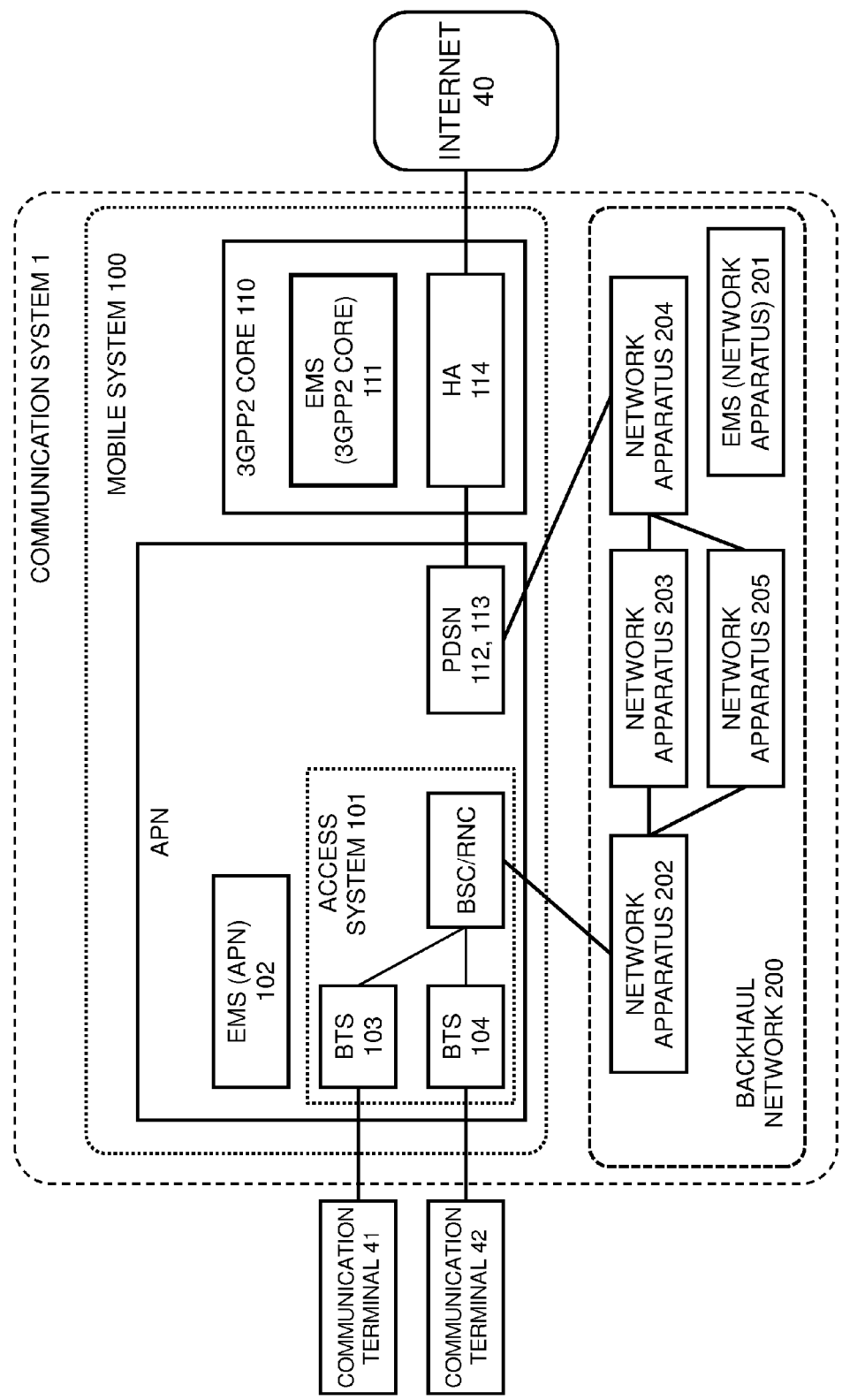
FIG. 30 is a schematic block diagram showing the more detailed architecture of a communication system (3GPP2 cdma 1×/EVDO) according to a third example of the present invention.

Referring to FIG. 30, a mobile system 100 in a 3GPP2 cdma 1×/EVDO system according to a third example of the present invention includes an APN (Access Provider Network), which includes an access system 101, and a 3GPP2 Core 110, which is a core system. The functionality of the control apparatus 50 in the third exemplary embodiment shown in FIG. 12 is included in an EMS 111 within the 3GPP2 Core 110 in the present example.

The APN includes: an EMS 102, which is an access function management section; an access system 101, which includes BTSs (Base Transceiver Stations) 103 and 104, which are access function sections, and a BSC (Base Station Controller)/RNC (Radio Network Controller), which is a base station control section; and PDSNs (Packet Data Serving Nodes) 112 and 113, which correspond to access gateway apparatuses. The 3GPP2 Core 110 includes the EMS 111, which is a core function management section, and a HA (Home Agent) 114, which corresponds to a mobile anchor function section. A backhaul network 200 is similar to that of the first example, and therefore a description thereof will be omitted.

5.4) Fourth Example (WiMAX: Worldwide Interoperability for Microwave Access)

Figure 31:
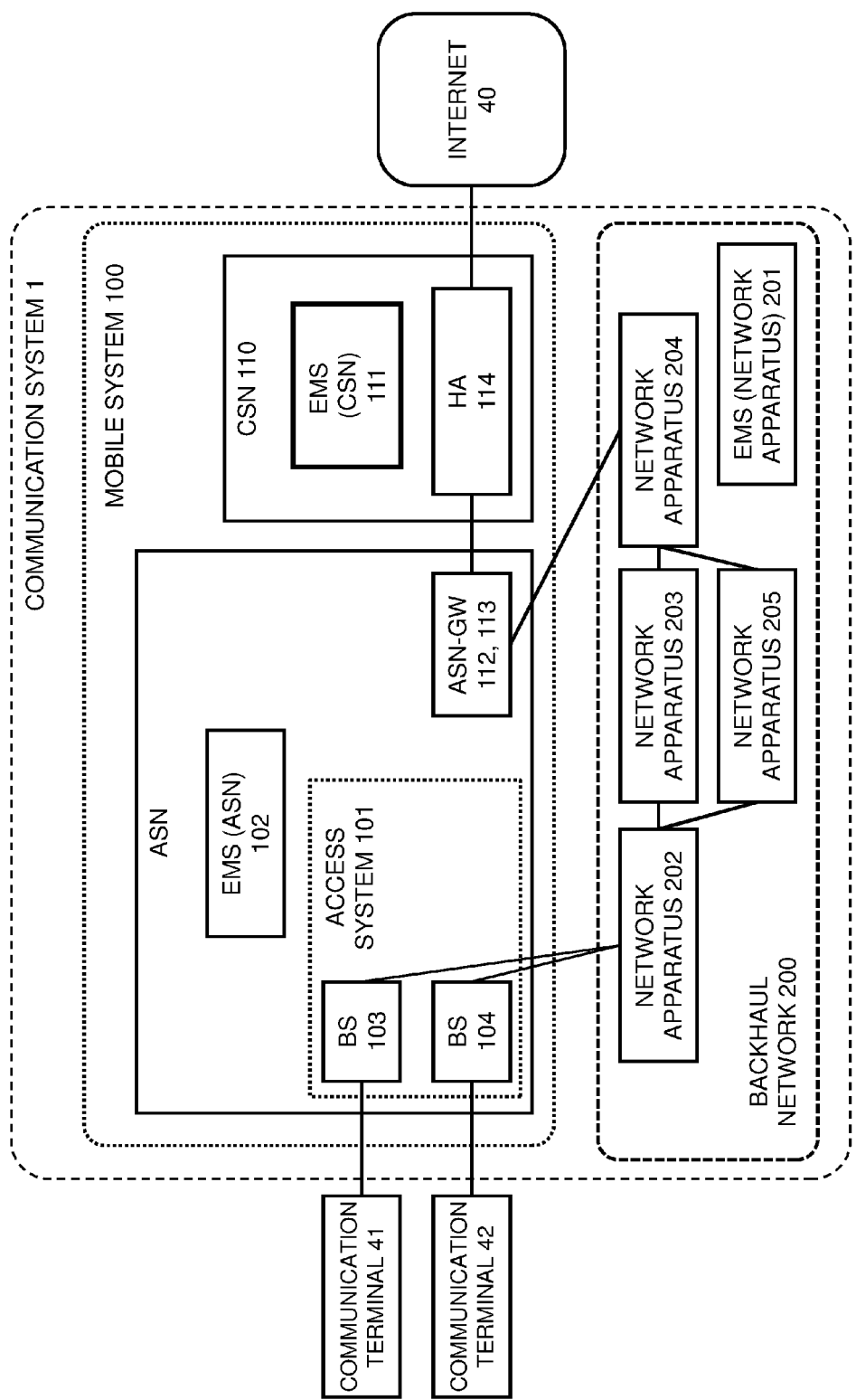
FIG. 31 is a schematic block diagram showing the more detailed architecture of a communication system (WiMAX) according to a fourth example of the present invention.

Referring to FIG. 31, a mobile system 100 in a WiMAX system according to a fourth example of the present invention includes an ASN (Access Service Network), which includes an access system 101, and a CSN (Connectivity Service Network) 110, which is a core system. The functionality of the control apparatus 50 in the third exemplary embodiment shown in FIG. 12 is included in an EMS 111 within the CSN 110 in the present example.

The ASN includes: an EMS 102, which is an access function management section; an access system 101, which includes BSs (Base Stations) 103 and 104, which are access function sections; and ASN-GWs (ASN Gateways) 112 and 113, which correspond to access gateway apparatuses. The CSN 110 includes the EMS 111, which is a core function management section, and a HA (Home Agent) 114, which corresponds to a mobile anchor function section. A backhaul network 200 is similar to that of the first example, and therefore a description thereof will be omitted.

INDUSTRIAL APPLICABILITY

The present invention is applicable to communication systems in which a logical path such as an EMS bearer is created to perform transmission and reception of packets.

REFERENCE SIGNS LIST

1 Communication system
10 Communication apparatus
10a Radio terminal
10b Radio base station
11 Control policy storage section
12 Control section
20 Communication apparatus
20a Access gateway apparatus
20b Mobile anchor gateway apparatus
30 Logical path
40 External network
41, 42 Communication terminal
50 Control apparatus
51 Management information storage section
52 Control policy management section
53 Control section
54 Communication section
100 Mobile system
101 Access system
102 Access function management section
103 Access function section
104 Access function section
110 Core system
111 Core function management section
112 Access GW (C-plane)
112 Access GW (U-plane)
114 Mobile anchor function section
200 Backhaul network
201 Packet forward function management section
202-205 Packet forward section
501 Node communication section
502 Control message processing section
503 Route and action calculation section
504 Packet forward function management section
505 Topology management section
506 Communication terminal location management section
507A Packet forward rule management section
507B Packet forward rule database (DB)
508 Logical path management section

The invention claimed is:

1. A communication system which establishes a logical path over a network to perform communication, comprising:
 a first communication apparatus;
 a second communication apparatus connected to the first communication apparatus through the logical path; and
 a control apparatus that retains a control policy indicating an association between the logical path and service quality information,
 wherein the control apparatus sends a control policy change message to at least one of the first and second communication apparatuses,
 wherein the control policy change message indicates a change of the service quality information, wherein said at least one of the first and second communication apparatuses, when receiving the control policy change message, provides a packet to be transmitted with the changed service quality information corresponding to the logical path to which the packet belongs in accordance with the control policy change message.

2. The communication system according to claim 1, wherein the control policy change message indicates a direct change of the service quality information,
 wherein said at least one of the first and second communication apparatuses, when receiving the control policy change message, provides a packet to be transmitted with the directly changed service quality information corresponding to the logical path to which the packet belongs in accordance with the control policy change message.

3. A control apparatus in a communication system in which a logical path is established over a network to perform communication, comprising:
 a storage section that retains a control policy indicating an association between the logical path and service quality information; and
 a controller that is configured to sends a control policy change message to a communication apparatus that establishes the logical path, wherein the control policy change message indicates a change of the service quality information corresponding to the logical path to which a packet belongs, wherein the communication apparatus provides a packet to be transmitted with the changed service quality information in accordance with the control policy change message.

4. The control apparatus according to claim 3, wherein the control policy includes a plurality of pieces of service quality information corresponding to the logical path, and notifies the communication apparatus of the control policy change message to change the service quality information to one of the pieces of service quality information.

5. The control apparatus according to claim 3, wherein the controller notifies the communication apparatus of the control policy including a criterion for identifying the logical path and an instruction to give the changed service quality information corresponding to the logical path to a packet that agrees with the criterion.

6. The control apparatus according to claim 3, wherein when the association between the logical path and the service quality information is updated, the controller changes the control policy used by the communication apparatus so as to reflect the update.

7. The control apparatus according to claim 3, wherein the controller, in response to an occurrence of congestion in the network, changes the service quality information corresponding to the logical path and notifies the communication apparatus of the control policy change message.

8. The control apparatus according to claim 3, wherein the controller, in response to a change of the service quality information identifiable within the network, changes the service quality information corresponding to the logical path and notifies the communication apparatus of the control policy change message.

9. The control apparatus according to claim 3, wherein the controller, in response to a change of the service quality information identifiable to a node that forwards packets in the network, changes the service quality information corresponding to the logical path and notifies the communication apparatus of the control policy change message.

10. A communication apparatus in a communication system in which a logical path is established over a network to perform communication, comprising:
a first section that is configured to receive a control policy change message from a control apparatus that retains a control policy indicating an association between the logical path and service quality information, wherein the control policy change message indicates a change of the service quality information; and
a second section that is configured to provide a packet to be transmitted with the changed service quality information corresponding to the logical path to which the packet belongs in accordance with the control policy change message.

11. The communication apparatus according to claim 10, wherein the first section receives the control policy change message to change the service quality information to one of a plurality of pieces of service quality information corresponding to the logical path.

12. The communication apparatus according to claim 10, wherein the first section receives the control policy change message including a criterion for identifying the logical path and an instruction to give the changed service quality information corresponding to the logical path to a packet that agrees with the criterion.

13. The communication apparatus according to claim 10, wherein the first section receives the control policy change message from the control apparatus, wherein the control apparatus changes the association between the logical path and the service quality information in response to an occurrence of congestion in the network, wherein the control policy change message indicates this change of the service quality information.

14. The communication apparatus according to claim 10, wherein the first section receives the control policy change message from the control apparatus, wherein the control apparatus changes the association between the logical path and the service quality information in response to a change of the service quality information identifiable within the network, wherein the control policy change message indicates this change of the service quality information.

15. The communication apparatus according to claim 10, wherein the first section receives the control policy change message from the control apparatus, wherein the control apparatus changes the association between the logical path and the service quality information in response to a change of the service quality information identifiable to a node that forwards packets in the network, wherein the control policy change message indicates this change of the service quality information.

16. A method for controlling service quality in a communication system in which a logical path is established over a network to perform communication, comprising:
retaining a control policy indicating an association between the logical path and service quality information; and
sending a control policy change message to a communication apparatus that establishes the logical path, wherein the control policy change message indicates a change of the service quality information corresponding to the logical path to which a packet belongs, wherein the communication apparatus provides a packet to be transmitted with the changed service quality information in accordance with the control policy change message.

17. A non-transitory medium storing a program causing a control apparatus in a communication system in which a logical path is established over a network to perform communication, to execute the processing of:
retaining a control policy indicating an association between the logical path and service quality information; and
sending a control policy change message to a communication apparatus that establishes the logical path, wherein the control policy change message indicates a change of the service quality information corresponding to the logical path to which a packet belongs, wherein the communication apparatus provides a packet to be transmitted with the changed service quality information in accordance with the control policy change message.

18. A control method for a communication apparatus in a communication system in which a logical path is established over a network to perform communication, comprising:
receiving a control policy change message from a control apparatus that retains a control policy indicating an association between the logical path and service quality information, wherein the control policy change message indicates a change of the service quality information; and
providing a packet to be transmitted with the changed service quality information corresponding to the logical path to which the packet belongs in accordance with the control policy change message.

19. A non-transitory medium storing a program causing a communication apparatus in a communication system in which a logical path is established over a network to perform communication, to execute the processing of:

receiving a control policy change message from a control apparatus that retains a control policy indicating an association between the logical path and service quality information, wherein the control policy change message indicates a change of the service quality information; and providing a packet to be transmitted with the changed service quality information corresponding to the logical path to which the packet belongs in accordance with the control policy change message.

* * * * *